Figure 1:
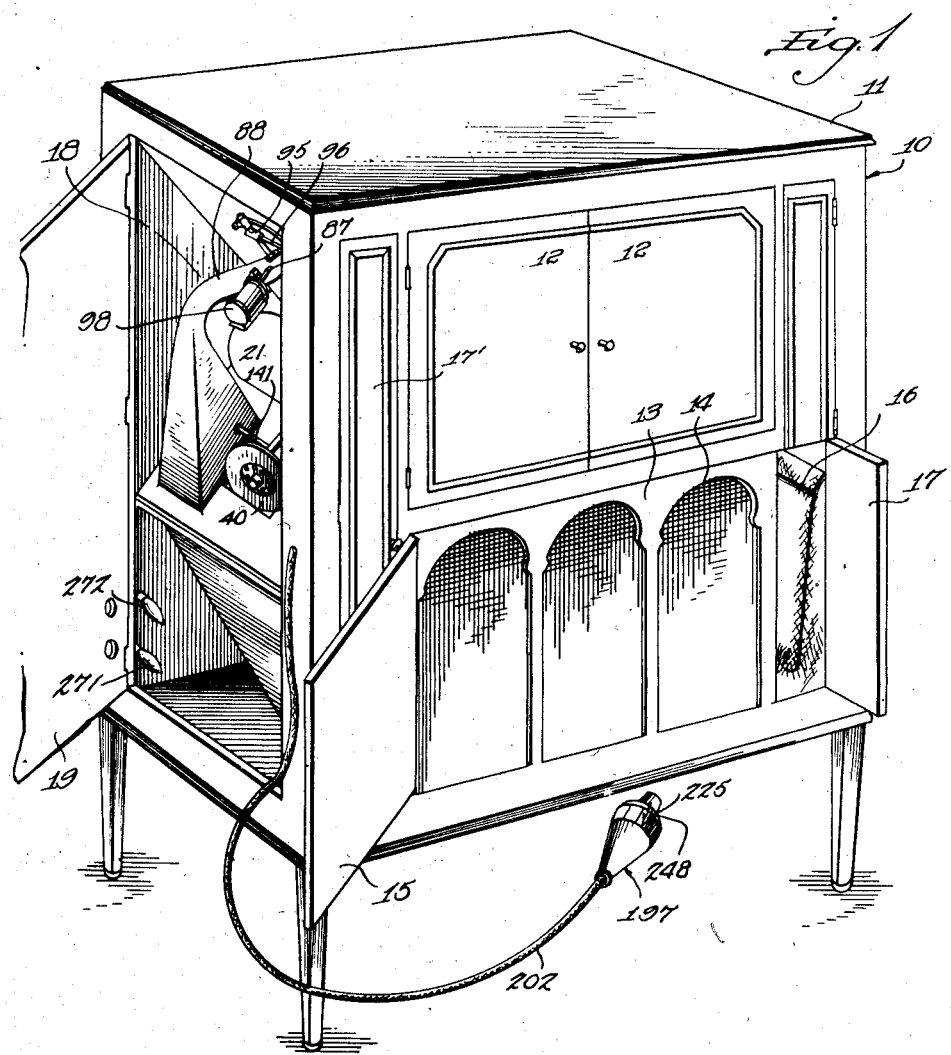

July 5, 1932.  J. BEGOVICH Y GARCIA  1,866,405

PHONOGRAPH

Filed Jan. 9, 1928  9 Sheets-Sheet 1

Inventor
JUAN BEGOVICH Y GARCIA

By  C. H. Farben
Attorney

July 5, 1932. J. BEGOVICH Y GARCIA 1,866,405
PHONOGRAPH
Filed Jan. 9, 1928 9 Sheets-Sheet 2

Inventor
JUAN BEGOVICH Y GARCIA
By
Attorney

July 5, 1932. J. BEGOVICH Y GARCIA 1,866,405
PHONOGRAPH
Filed Jan. 9, 1928 9 Sheets-Sheet 3

Inventor
JUAN BEGOVICH Y GARCIA

July 5, 1932. J. BEGOVICH Y GARCIA 1,866,405
PHONOGRAPH
Filed Jan. 9, 1928 9 Sheets-Sheet 4

Inventor
JUAN BEGOVICH Y GARCIA

By
Attorney

July 5, 1932. J. BEGOVICH Y GARCIA 1,866,405
PHONOGRAPH
Filed Jan. 9, 1928  9 Sheets-Sheet 5
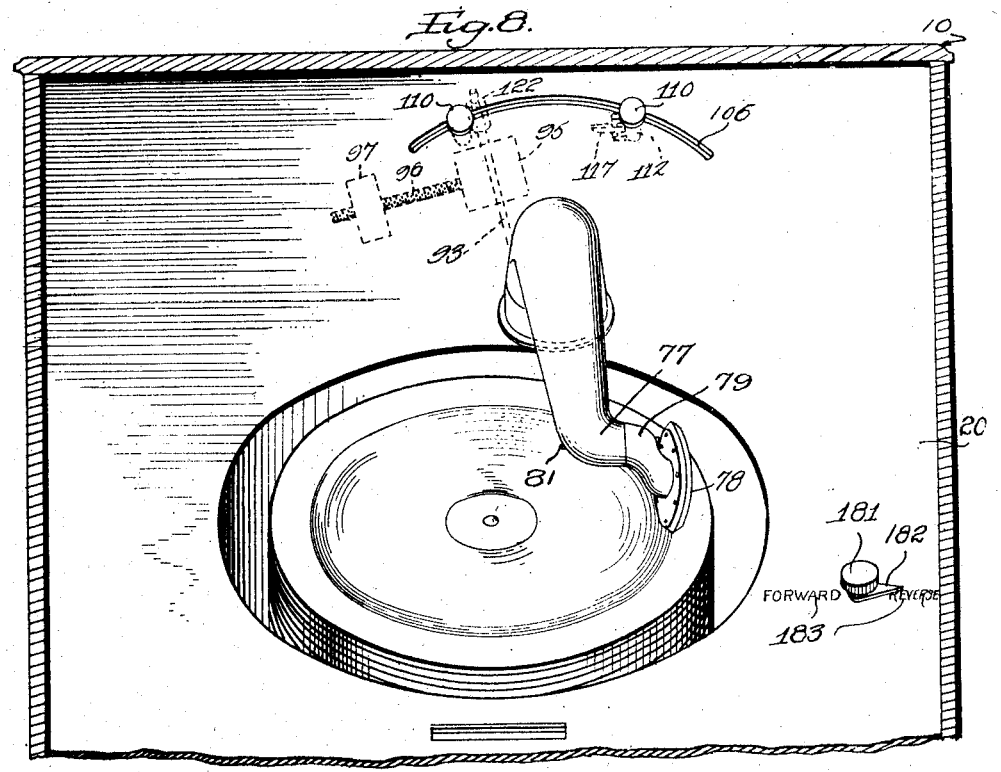
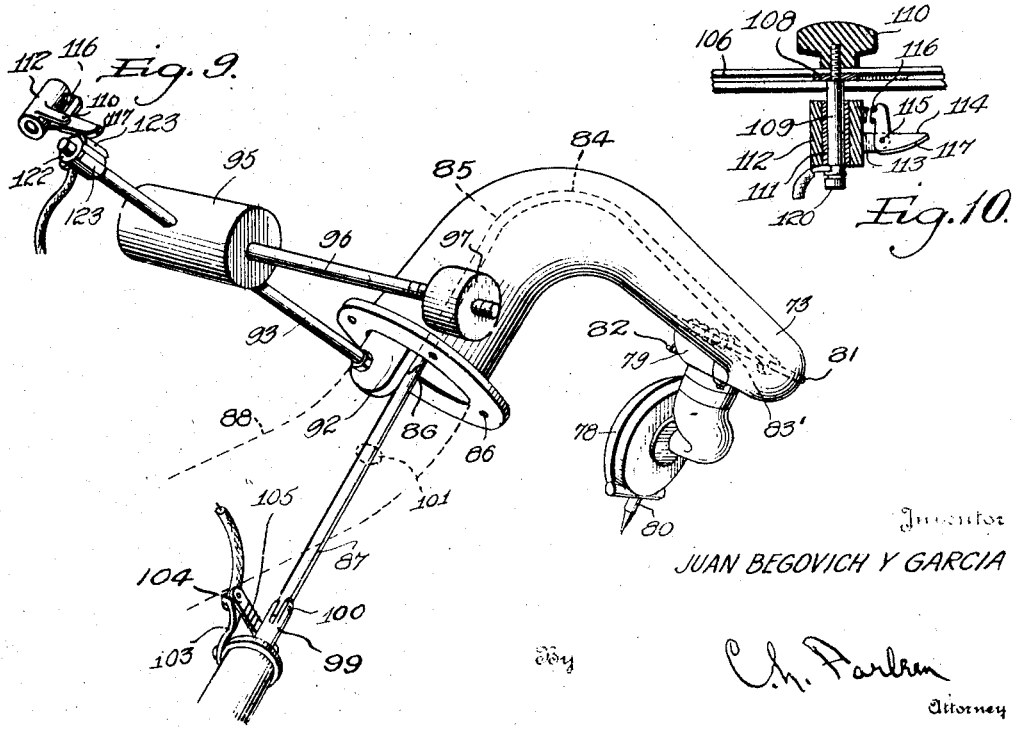
JUAN BEGOVICH Y GARCIA

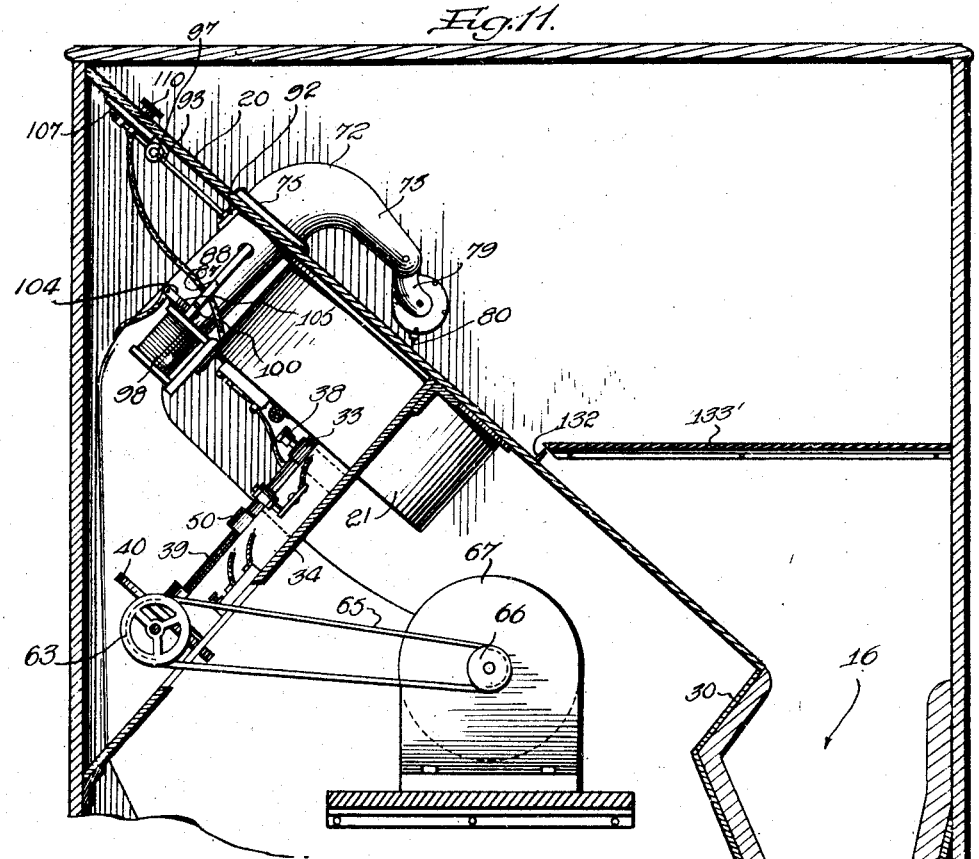
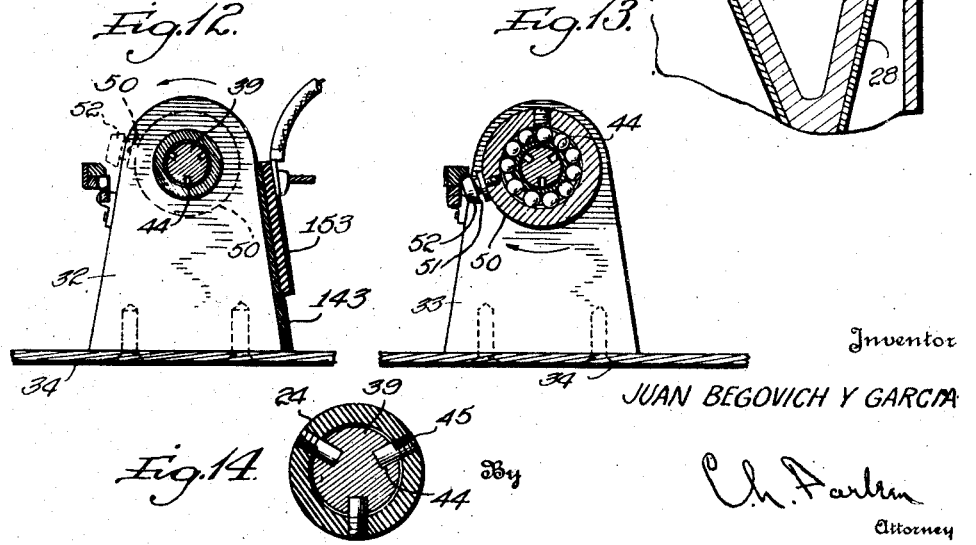

July 5, 1932.   J. BEGOVICH Y GARCIA   1,866,405
PHONOGRAPH
Filed Jan. 9, 1928     9 Sheets-Sheet 7
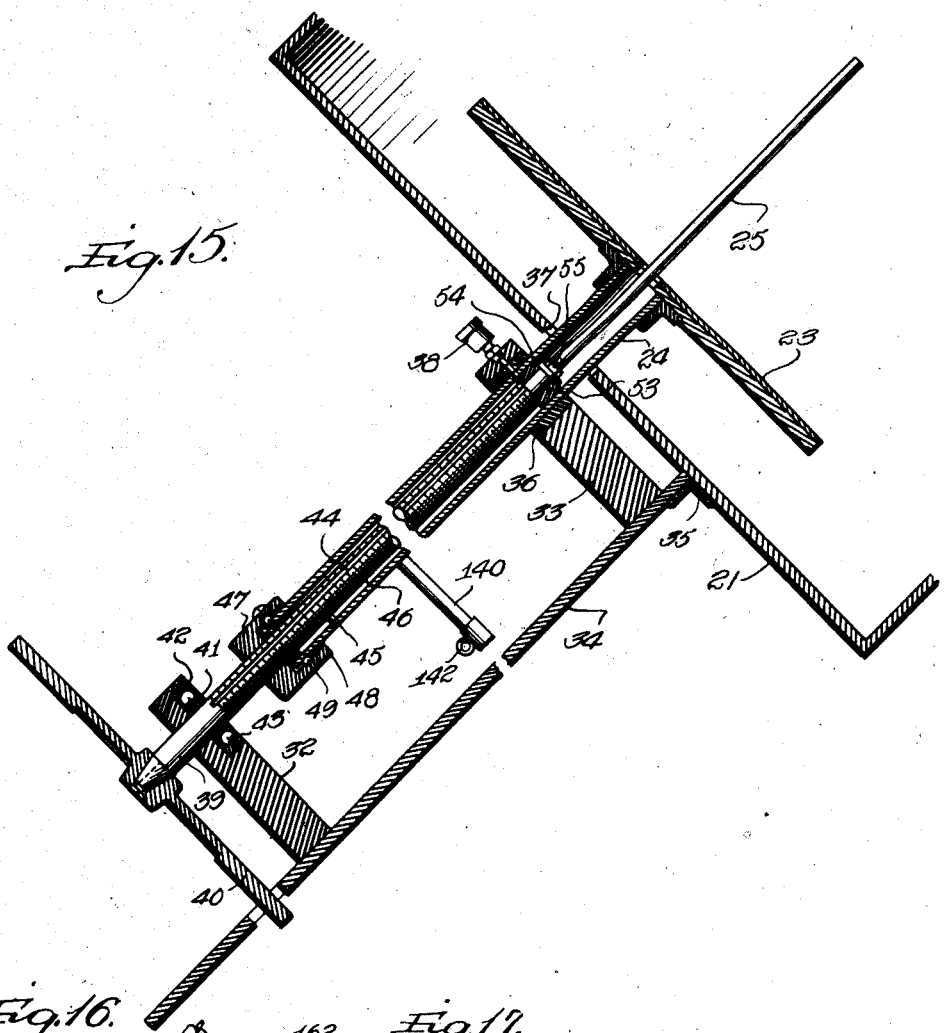
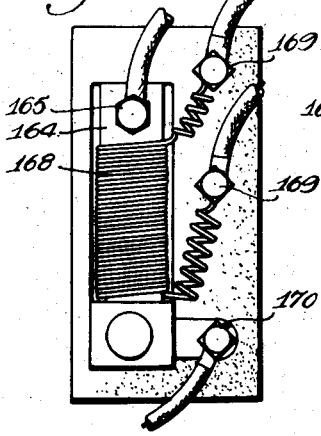
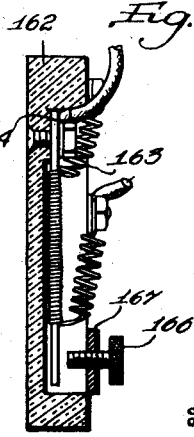
Inventor
JUAN BEGOVICH Y GARCIA

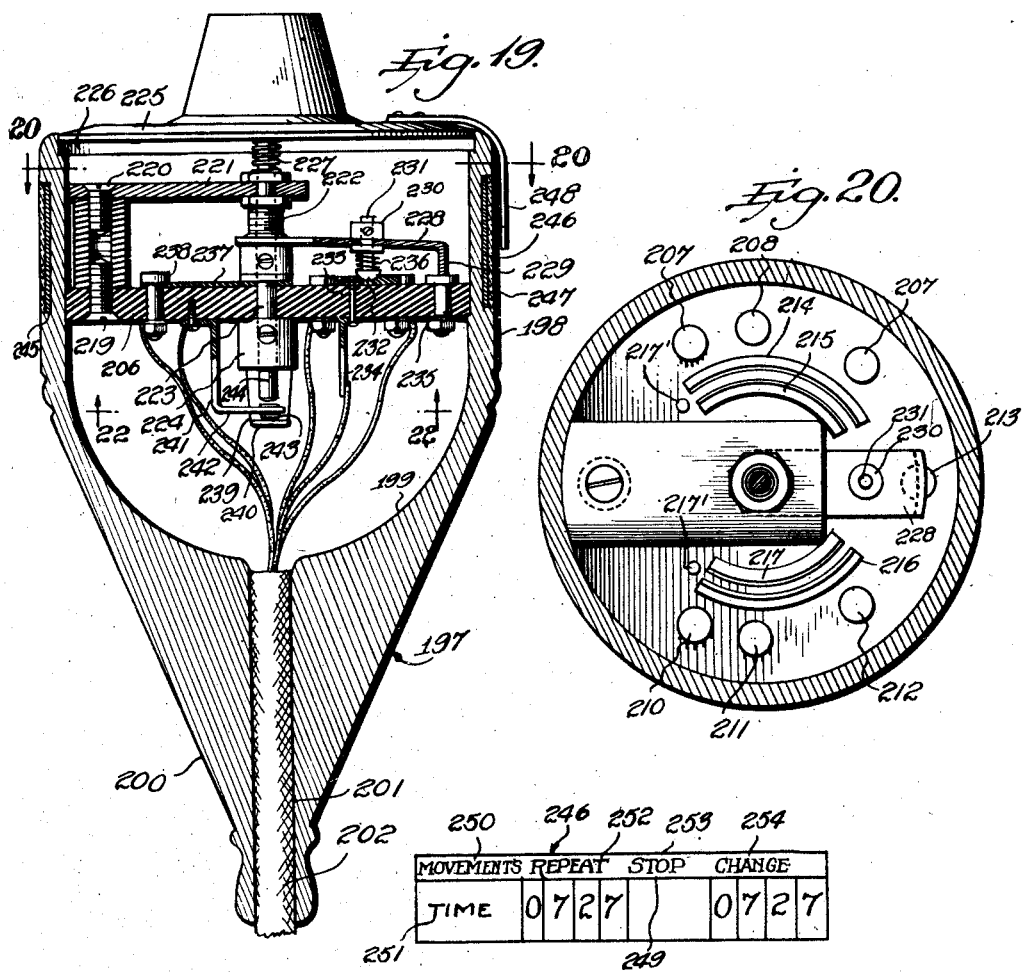
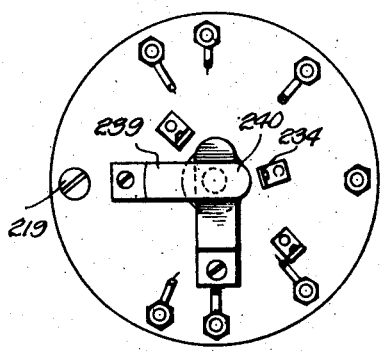

July 5, 1932. J. BEGOVICH Y GARCIA 1,866,405
PHONOGRAPH
Filed Jan. 9, 1928 9 Sheets-Sheet 9

Inventor
JUAN BEGOVICH Y GARCIA

Attorney

Patented July 5, 1932

1,866,405

UNITED STATES PATENT OFFICE

JUAN BEGOVICH y GARCIA, OF SANTA JULIA, MEXICO CITY, MEXICO

PHONOGRAPH

Application filed January 9, 1928, Serial No. 245,524, and in Mexico October 22, 1927.

This invention relates to phonographs, and more particularly to an apparatus of this type which is adapted to perform numerous functions in addition to those usually performed by the ordinary types of machines.

In the present type of phonograph, it is the common practice to place successive individual records upon the rotatable table and to manually start the machine, and to place the needle upon the record. It is the common practice at present to provide automatic means for stopping the operation of the machine upon the completion of the playing of a record, but as a rule, all other functions having to do with the repeating and changing of records, etc., are performed manually.

An important object of the present invention is to provide a phonograph wherein numerous functions usually performed manually may be quickly and readily accomplished automatically.

A further object is to provide a phonograph wherein either the repeating of an entire record or portions thereof commencing at the beginning of the record may be accomplished at the will of the operator without the necessity of restarting the machine or replacing the reproducing needle at the beginning of the sound groove of the record.

A further object is to provide means for automatically discarding a record upon the completion of the playing thereof and to start the playing of the next record, and also to provide means whereby a record may be discarded, at the will of the operator, before the playing thereof has been completed to permit the playing of the next record to take place.

A further object is to provide a phonograph of the character referred to having means for supporting a plurality of superimposed records upon which the operations previously described may be performed, and to provide means whereby any record or number of records may be discarded without the playing thereof.

A further object is to provide a phonograph of the character referred to wherein the repeating of records or the playing of successive records after the discarding of previous ones may take place immediately or after varying selected intervals.

A further object is to provide means including a clock mechanism whereby the playing of a record may be commenced at any given time, after the clock mechanism and suitable control means have been selectively arranged according to the time at which the playing of the record is desired to take place.

A further object is to provide novel means for elevating the reproducing stylus at the end of a record or at any desired time during the playing of a record whereby the same record may be repeated or the next record played, and to provide novel means for effecting movement of the reproducing stylus back to initial position to start the playing of a record at the beginning thereof.

A further object is to provide novel means of the character referred to for elevating the reproducing stylus and to provide gravity means operable independently of the elevating means for causing the reproducing stylus to swing back to initial position.

A further object is to provide novel electrically controlled means for elevating the reproducing stylus at any desired time and for lowering the stylus to playing position relatively slowly to prevent injury to the record upon the lowering of the stylus.

A further object is to provide a magazine for holding a number of records in contacting superimposed relation and to provide means for rotating the records whereby the upper one may contact with the reproducing stylus to permit the record to be played, and to provide novel means for successively removing the uppermost records in the magazine to permit successive records to be played.

A further object is to provide a magazine including a rotatable record supporting table having an elongated spindle projecting through the center thereof and extending a substantial distance from the surface of the table, and to provide novel means operable only when the stylus is elevated from the record for elevating the table with respect to the spindle to permit successive records to be removed from the magazine.

A further object is to provide novel means for driving the record supporting table and effecting elevation thereof to permit successive records to slide laterally from their position above the next successive records whereby the stylus may be lowered to play the latter.

A further object is to provide a supporting table and spindle of the character referred to which are angularly arranged to permit the discarding of a record by gravity upon the upward movement of the table with respect to the spindle to a point where the uppermost record will be elevated above the end of the spindle.

A further object is to provide automatic means operative upon movement of a record away from its position above the next successive record for lowering the stylus to contact with the latter.

A further object is to provide electrically controlled means for elevating and lowering the stylus between which operations the tone arm swings to starting position, and to provide automatic means for lowering the stylus to begin the playing of a record only after the tone arm has come to a position at rest after swinging back to initial position.

A further object is to provide automatic means for stopping the operation of the machine when the magazine becomes empty.

A further object is to provide novel electric circuit means for performing the functions above referred to and control means for selectively closing the circuits, and to provide manual means associated with the control means for immediately closing the selected circuits to accomplish the repeating or record changing actions without awaiting the completion of the playing of a record.

A further object is to provide a novel receiver for the records discarded from the turntable when it is desired to play successive records.

A further object is to provide suitable circuits including normally stationary contacts adapted to be engaged, when the stylus reaches the end of the record ready to be raised and at the initial position ready to be lowered into contact with a record, by a contact movable with the tone arm, the normal stationary contacts being adjustable to permit the desired functions to take place when records of different sizes are being played.

Figure 18:
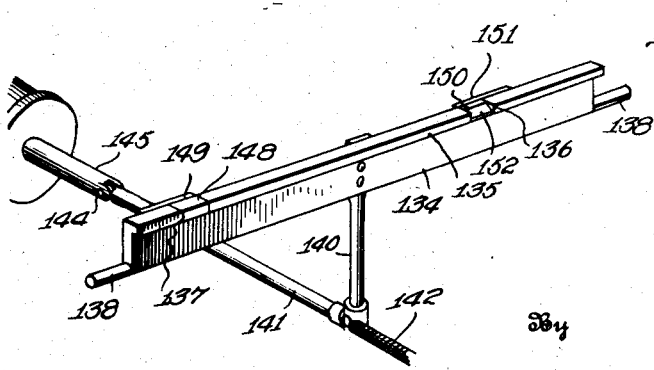
Figure 2:
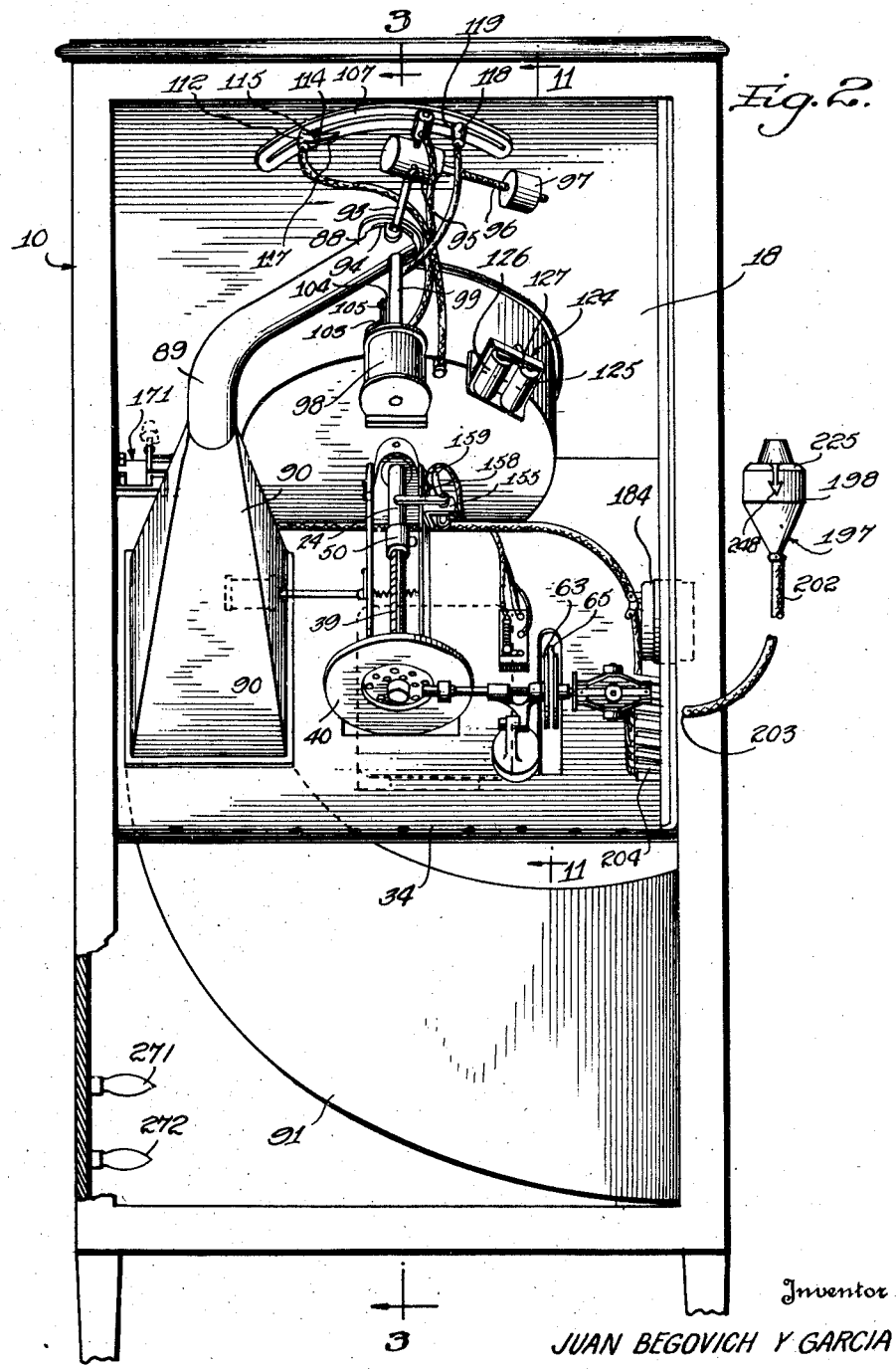
Figure 3:
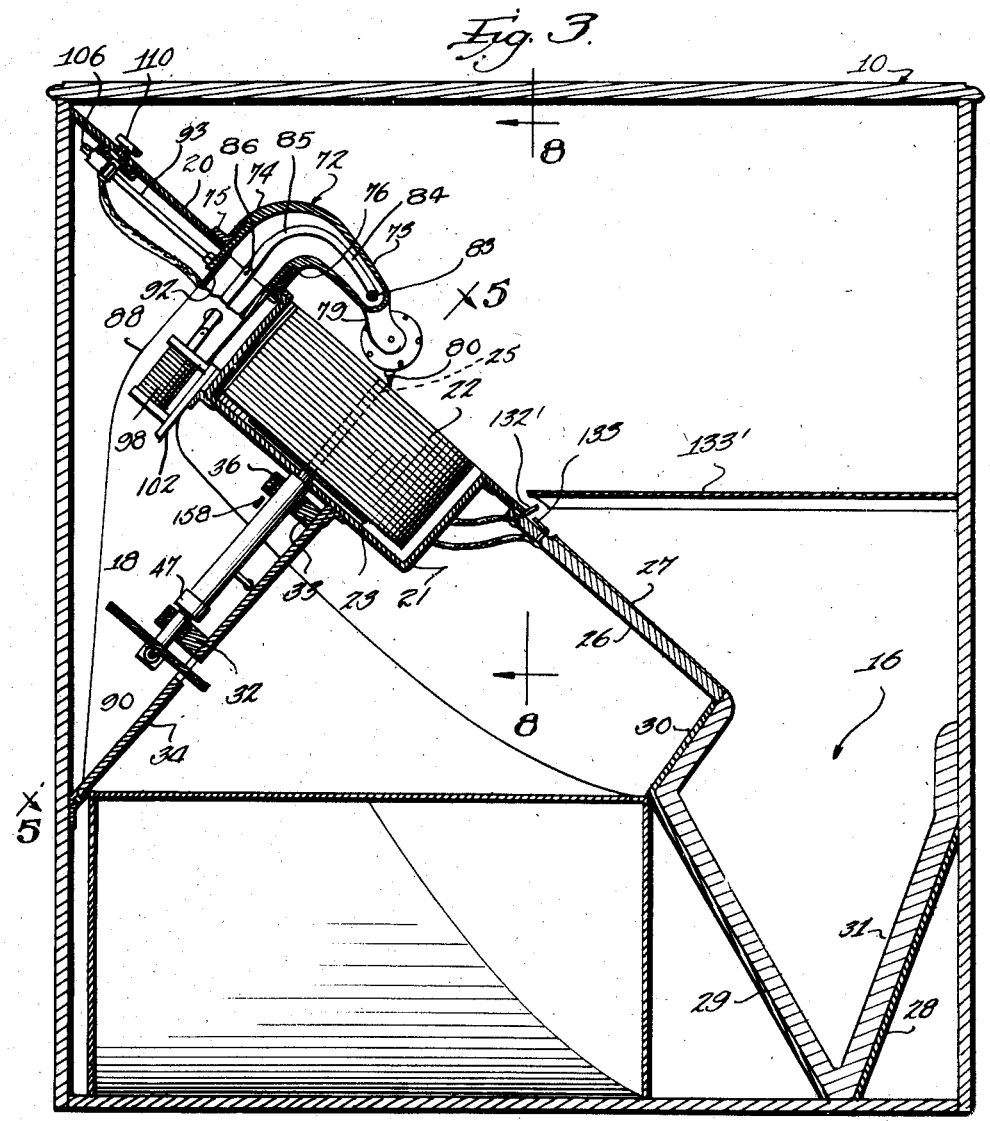
Figure 4:
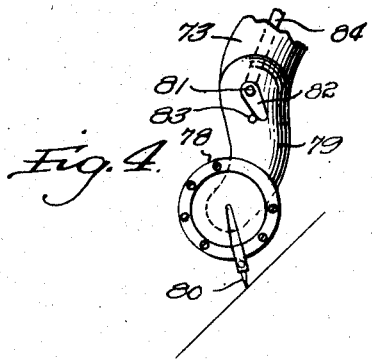
Figure 5:
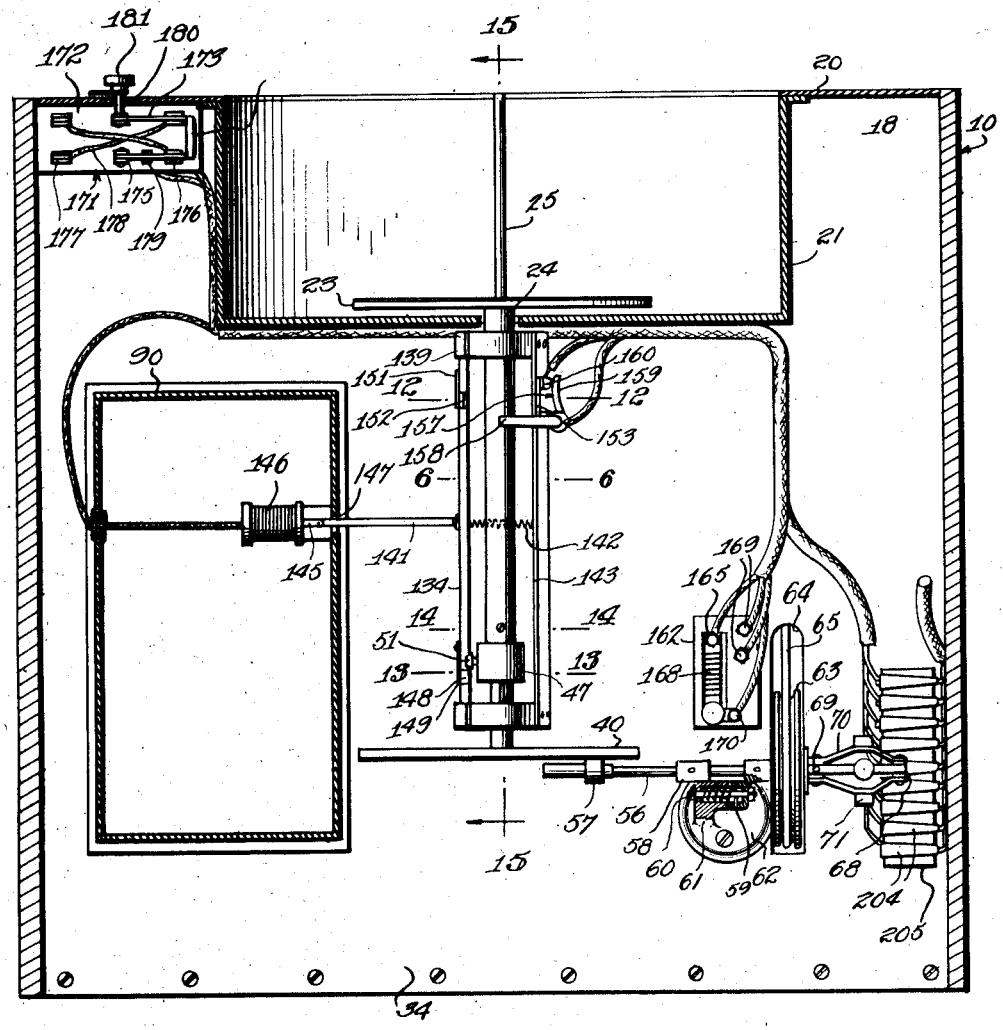
Figure 6:
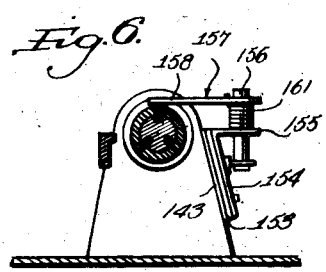
Figure 7:
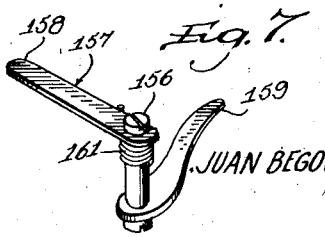
Figures 23, 24:
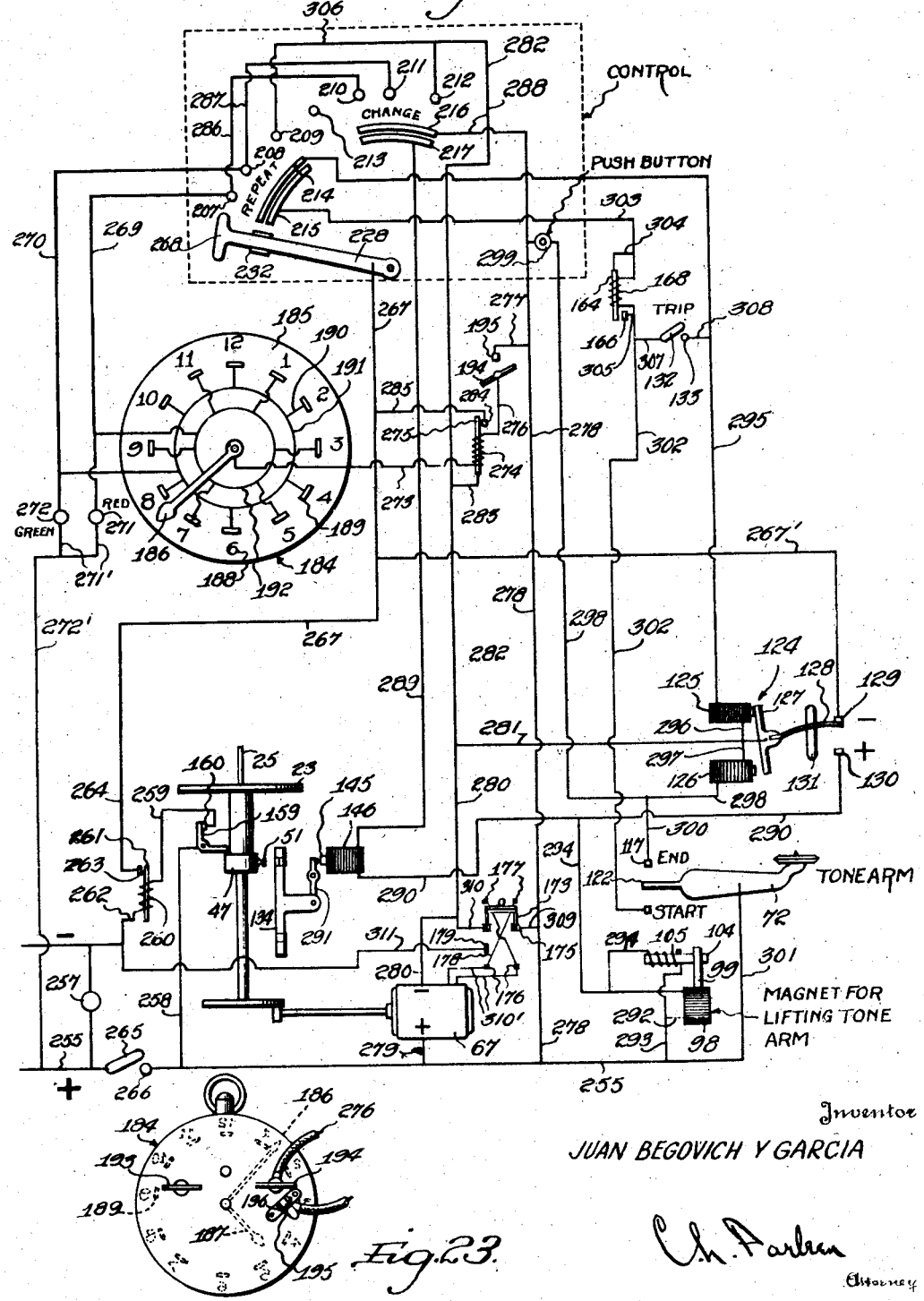

In the drawings I have shown one embodiment of the invention. In this showing,

Figure 1 is a perspective view of the phonograph showing certain of the doors thereof in open position, Figure 2 is an elevation of one end of the machine with the door removed, parts being broken away, Figure 3 is a section on line 3—3 of Figure 2, Figure 4 is a detail view of the free end of the tone arm and associated elements, Figure 5 is a section on line 5—5 of Figure 3, Figure 6 is a detail section on line 6—6 of Figure 5, Figure 7 is a detail perspective view of a cut out switch, Figure 8 is a section on line 8—8 of Figure 3, Figure 9 is a detail perspective view of the tone arm and associated elements, Figure 10 is a detail section of a switch adapted to be closed upon arrival of the reproducing stylus at the end of a record, Figure 11 is a section on line 11—11 of Figure 2, Figure 12 is a detail section on line 12—12 of Figure 5, Figure 13 is a similar view on line 13—13 of Figure 5, Figure 14 is a similar view on line 14—14 of Figure 5, Figure 15 is an enlarged fragmentary sectional view on line 15—15 of Figure 5, Figure 16 is a detail face view of one of the thermal switches, Figure 17 is a detail longitudinal sectional view of the same, Figure 18 is a detail perspective of a control bar operated for effecting movement of the record supporting table on its axis of rotation, and associated elements, Figure 19 is a longitudinal sectional view of the control for the apparatus, parts being shown in elevation, Figure 20 is a section on line 20—20 of Figure 19, Figure 21 is a detail face view of the index strip of the control, Figure 22 is a section on line 22—22 of Figure 19, Figure 23 is a rear view of a clock employed in carrying out certain functions of the apparatus, and, Figure 24 is a diagrammatic view of the electric system employed in connection with the apparatus.

Referring to Figure 1, the numeral 10 designates the cabinet of the apparatus as a whole having a hinged top 11 and front doors 12, the latter being adapted to be opened to provide access to the turntable of the machine and associated elements. The horn or other tone amplifying means, to be described, is adapted to pass the sound waves through a suitable ornamental grille 13 covered at its inner face with any desired decorative cloth 14. The outlet of the tone amplifying chamber is adapted to be closed by doors 15. A compartment indicated as a whole by the numeral 16 is adapted to receive records discharged from the turntable, in a manner to be described, and this compartment may be closed at its front end by a suitable door 17. The cabinet also is provided at its opposite side with a door 17'. Most of the operating elements of the apparatus, to be described, are arranged in a compartment 18 in one end of the cabinet, and this compartment also will be provided with a suitable door 19.

Referring to Figures 3, 5 and 15, the numeral 20 designates an inclined plate arranged in the upper portion of one side of the cabinet and forming the top of the operating compartment 18. The plate 20 preferably is arranged at an angle of 45°, although it will be apparent that this angle may be varied, if desired. The plate 20 is provided with a preferably cylindrical magazine 21 depending therefrom at right angles thereto and adapted to receive any number of record disks 22, as will be desired. In the form of the apparatus described, the magazine is adapted to receive approximately 50 records, but it will be apparent that the apparatus readily may be designed to accommodate any number of records within reasonable limits. The records are supported upon a turntable 23 mounted on the upper end of a tubular shaft 24. The turntable and tubular shaft are rotatable and movable axially in a manner to be described, and a spindle 25 extends through the shaft and table and projects upwardly beyond the latter for reception within the center openings of the record disks. It will be apparent that upward movement of the table will lift the records in the magazine, when desired, to elevate successive uppermost records beyond the end of the spindle 25 whereby they will be released therefrom to slide from the lower end of the plate 20 by gravity.

The lower end of the plate 20 is connected to a partition 26 forming a continuation thereof, and this partition may be provided with an upper felt or similar facing 27. Records discharged from the magazine, after being released from the spindle, slide over the lower end of the plate 20 and over the facing 27 to be discharged into the compartment 16 previously referred to. The compartment 16 comprises an outer partition 28 and an inner partition 29 which may be formed of light wood or the like and they diverge toward their upper ends. The upper end of the partition 29 connects to another partition 30 which may be arranged as shown in Figure 3 and connected at its upper end to the lower end of the partition 26. The inner faces of the partitions 28, 29 and 30 are provided with relatively thick pads 31 to prevent injury to the records falling into the receiving compartments. The bottom of the compartment preferably is inclined downwardly away from the door 17, shown in Figure 1, to eliminate the possibility of the records falling out of the cabinet if the door 17 should be left open.

Referring to Figures 12, 13, 14 and 15, the numerals 32 and 33 designate a pair of bearing brackets mounted upon an inclined supporting plate 34, the upper end of the latter preferably being secured to the bottom of the magazine by a bracket 35. The edge portions of the plate 34 may be suitably secured to the front and rear walls of the cabinet, as will be obvious. The upper end of the bracket 33 is provided with a bearing bushing 36 rotatably receiving the hollow shaft 24, which projects through an opening 37 formed in the bottom of the magazine. A grease cup 38 may supply lubricant to the interior of the bushing 36. The bracket 32 receives a drive shaft 39 the lower end of which is secured to a driving disk 40. As shown in Figure 15, a ring 41 is secured to the shaft 39 while a coacting ring 42 is secured to the bracket 32. These rings constitute races to receive balls 43, and since the ring 41 is slightly spaced from the bottom of the recess in which the ring 42 is arranged, it will be apparent that the elements described constitute both lateral and thrust bearings for the shaft 39. A plurality of longitudinal grooves 44 is formed in the shaft 39 and these grooves receive pins 45 carried by the hollow shaft 24. The pins are slidable in the grooves to form a spline connection between the shafts 24 and 39 whereby it will be apparent that the former is positively rotated by the shaft 39, but is adapted to partake of axial sliding movement with respect thereto. The upper portion of the shaft 39 also is threaded as at 46 for connection with a collar 47, the latter being provided with an upwardly extending sleeve 48 forming a recess in which the lower end of the shaft 24 is arranged. Balls 49, adapted to take up lateral and end thrusts between the shaft 24 and collar 47, are arranged in suitable grooves formed in the exterior of the lower end of the shaft 24 and in the interior of the sleeve 48. Unless rotation of the collar is stopped, it will be apparent that the shafts 24 and 39 are adapted to rotate as a unit without relative sliding movement therebetween, and one side of the collar 47 is provided with a small stub shaft 50, as shown in Figure 13, to rotatably support a roller 51 having an annular bevel face 52 at its outer end. Means to be described are provided for engaging the roller 51 to prevent rotation of the collar 47 whereby it will travel along the threads 46 to effect axial movement of the hollow shaft 24. The upper end of the shaft 39 is reduced as at 53 and is received in a bearing bushing 54 arranged within the shaft 24. The lower end of the spindle 25 is connected to the reduced end of the shaft 39 by a suitable nut 55.

Referring to Figures 5 and 11, the numeral 56 designates a transverse shaft having a rubber or similar friction roller 57 adjacent one end thereof adapted to engage the driving disk 40 to rotate the latter. The shaft is journalled in a bearing yoke 58 having a depending ear 59 pivotally connected by a bolt 60 to an upstanding lug 61, the latter being carried by a base 62, supported upon the plate 34. The lug 61 is hollow and is provided with a coil spring 61' acting on the ear 59, to maintain the roller 57 in firm contact with the disk 40. A grooved pulley 63 is fixed to the shaft 56 and is arranged in alinement with an opening 64 formed in the plate 34. An elastic belt 65, preferably formed of rubber, passes around the pulley 63 and around a pulley 66 (see Figure 11) mounted upon the armature shaft of a motor 67. The elastic belt 65 tends to minimize the abrupt strains on the apparatus when the motor is started, and also assists in maintaining the driving connection between roller 57 and disk 40. In view of the elasticity of the belt 65, there is a slight tendency for the power to be transmitted unevenly from the motor to the shaft 56, particularly when the motor is initially operated, and means is provided to equalize the rotative speed of the shaft 56. A collar 68 is fixed to the outer end of the shaft 56, while a similar collar 69 is arranged adjacent the pulley 63 and slidable on the shaft 56. Spring leaves 70 are connected at their ends to the collars 68 and 69 and are provided substantially centrally thereof with weights 71 similar to ordinary ball governor weights. Any tendency of the shaft 56 to race as the belt 65 becomes tensioned when the motor is started, tends to throw the weights 71 outwardly, thus increasing the inertia of the mass rotating about the axis of the shaft 56, and the rotational speed thereof will be equalized and the shaft will be brought to a constant rotational speed more rapidly than otherwise would occur.

A tone arm 72 is mounted above the plate 20, as shown in Figures 3, 8, 9 and 11. This tone arm is provided with a downwardly extending angular portion 73 normally arranged substantially parallel to the plate 20, and an angular portion 74 arranged substantially at right angles to the plate 20. A guide sleeve 75 is carried by the plate 20 to rotatably support the tone arm, the larger end of the latter being shouldered as at 76 whereby it will be supported for rotation. The tone arm decreases in diameter toward its outer end in the usual manner, and the smaller end projects laterally as at 77 (see Figure 9). A reproducer 78 is carried by a goose-neck 79 which has a laterally extending upper end arranged in alinement with and swiveled to the lateral projection 77 of the tone arm. The reproducer 78 is provided with the usual reproducing stylus 80 which may be of any kind, but preferably is of the semi-permanent type. A shaft 81 extends axially through the lateral extension 77 and the adjacent portion of the goose-neck 79 and is provided outwardly of the latter with a finger 82 adapted, under certain conditions, to engage a pin 83 carried by the connection 79 whereby rotation of the shaft 77 through a relatively small arc of a circle is adapted to lift the reproducer to space the stylus 80 a slight distance above the record. A spring 83' surrounding shaft 81, normally urges the reproducer downwardly. A lever 84 is secured at one end to the shaft 81 and at its upper end, the lever 84 extends downwardly as at 85 for connection as at 86 with one end of a link 87 preferably formed of material having a slight degree of elasticity, such as a relatively thick stem of pure rubber. It will be apparent that when the link 87 is moved downwardly by means to be described, the lever 84 will swing downwardly to rock the shaft 81 about its axis and thus cause the finger 82 to engage the pin 83 and elevate the stylus and reproducer.

The larger end of the tone arm communicates with a preferably slightly tapered neck 88, the upper extremity of which is arranged in alinement with the adjacent end of the tone arm. Beneath its upper end, the neck 88 is inclined downwardly and rearwardly and terminates in a curved extension 89 which connects to the smaller end of an amplifying horn 90. This horn extends through the plate 34 for connection with the smaller end of an amplifying bell 91, the latter element curving whereby its larger end will be arranged adjacent the grille 13 to discharge the amplified sound waves therethrough.

Means are provided for mechanically and electrically controlling movement of the tone arm and associated elements, and for raising and lowering the stylus. Referring to Figures 2, 3, 8 and 9, the numeral 92 designates a projection carried by the larger end of the tone arm and extending into the upper end of the neck 88. This projection 92 is rigidly connected to the inner end of an arm 93 arranged substantially parallel to the portion 73 of the tone arm. The arm 93 projects through a slot 94 formed in the neck 88 whereby the arm 93 is permitted to swing with the tone arm as the stylus moves across the record to play the latter, or moves from the inner portion of a record to the outer portion of the same or a succeeding record. The arm 93 is provided near its outer end with a weight 95 adapted to substantially counter-balance the tone arm and elements carried thereby. The weight 95 is provided with a threaded stem 96 to adjustably receive an offset weight 97 which is adapted to slightly overbalance the tone arm, as will become apparent, thus slightly tending to move the stylus 81 toward the starting point of a record. Thus it will be apparent that when the stylus is elevated at any position with respect to the sound groove of the record, the stylus will be caused to swing toward the outer edge of the record by gravity. The downward movement of the link 87 and the consequent elevation of the reproducer and stylus is effected by means of a solenoid 98 having an armature 99 connected at its upper end to the link 87, as at 100. As previously stated, the neck 88 is provided intermediate its ends with a downwardly and rearwardly projecting portion, and this construction permits the solenoid 98 to be arranged in alinement with the link 87, the latter extending through a small opening 101 formed in the neck 88. The solenoid 98 may be supported by a bracket 102, and this bracket may be secured to any suitable part of the apparatus such as the magazine 21, as shown in Figure 3. It will be apparent that when the solenoid is energized, the armature thereof will be drawn downwardly to elevate the reproducer, and conversely, when the solenoid is deenergized, the armature thereof will be released to permit the reproducer to drop by gravity.

It has been found that if the tone arm is permitted to drop suddenly upon deenergization of the solenoid 98, the stylus will cause injury to the starting portion of the sound groove of a record, and the stylus itself will be dulled. Accordingly means is provided for retarding the return movement of the reproducer to operative position. Referring to Figure 9, the numeral 103 designates a bracket to one end of which is rigidly connected a brake element 104 in the form of a strip of heat responsive material which is adapted, when heated, to warp and thus frictionally engage the armature 99. The brake element is surrounded by a coil 105 which is adapted to be energized simultaneously with the solenoid 98 whereby the brake element will be caused to engage the armature 99 almost simultaneously with the downward movement of the latter, and thus it will be apparent that the brake element will be in operative position to retard the return movement of the reproducer to normal position upon deenergization of the solenoid 98. The circuit means for controlling the solenoid and brake element will be referred to later.

Circuits are adapted to be completed upon arrival of the stylus at the starting and finishing positions with respect to the tone groove of a record. These circuits are such that when the stylus reaches a position adjacent the beginning of the sound groove of a record, a circuit will be closed to effect deenergization of the solenoid 98 to drop the stylus upon the record, and such that when the stylus reaches the end of a record, the solenoid 98 will be energized to lift the stylus from the record. Referring to Figures 2, 3, 8, 9 and 10, the numeral 106 designates an arcuate slot formed in the plate 20 concentric with the axis about which the tone arm swings. L-shaped guides 107 are arranged beneath the slot and slidably receive a pair of plates 108 each of which is associated with one of the circuit closing means just referred to. Each of the plates is provided with a stem 109, the upper end of which is reduced and extends through the slot 106 for threaded connection with a knob 110, the loosening of which permits the plates 108 and associated elements to be moved longitudinally of the groove 106, for a purpose to be described. Each of the stems 109 is provided with an insulating sleeve 111 one of which is surrounded by a brass or similar sleeve 112. The sleeve 112 is provided with a pair of ears 113 between which is pivotally connected an L-shaped switch member 114 as at 115. A spring 116 retains the switch member in normal position, as indicated in Figure 10. One edge of the switch member preferably is provided with a platinum strip 117 to prevent injury to the switch member when the latter is engaged by the contact to be described. The other insulating sleeve 111 is also surrounded by a brass or similar sleeve 118 provided at one side with a platinum contact 119. Each stem 109 is provided at one end with a suitable binding post 120.

The outer end of the arm 93 is provided with an insulating sleeve 121 (see Figure 9) which is surrounded by a brass or similar sleeve 122 preferably carrying platinum contact strips 123 adapted to contact with the platinum strips 117 and 119. It will be apparent that when the tone arm swings toward the starting point of a record, the sleeve 122, through its contact 123 striking the sleeve 118, will limit the movement of the tone arm to position it properly above the starting point of the record. Similarly as the stylus reaches the end of the tone groove of the record, one of the platinum strips 123 will contact with the switch arm 114. Records of different makes are provided with different termini at the ends of the sound grooves, some being provided with eccentric and others spiral extensions of the sound groove. The inner extremities of such sound groove extensions are arranged at slightly different distances from the centers of the records, and accordingly the pivoted switch member 114 is provided to permit proper movement of the tone arm whereby its stylus may follow the sound groove extensions to their innermost limits.

As previously stated, energization of the solenoid 98 is adapted to lift the stylus from the record at the completion of the playing thereof, or at any intermediate point during the playing of the record at the will of the operator, while deenergization of the solenoid permits the stylus to drop into contact with the tone groove of the record at the beginning thereof. In order properly to operate the solenoid and simultaneously perform other electrical functions to be described, a relay indicated as a whole by the numeral 124, is arranged in the operating compartment 18. This relay comprises a pair of coils 125 and 126 which are selectively, but never simultaneously, energized to attract the ends of an armature 127. The armature is provided with a preferably resilient extension 128 which is adapted selectively to engage contacts 129 and 130 depending upon which of the coils 125 or 126 is energized, and any suitable means may be employed for retaining the contact 128 in either position until the other magnet of the relay is energized. In Figure 24 of the drawings a resilient member 131 is illustrated, and this member has frictional contact with the arm 128 to maintain it in either selected position until it is desired to swing it to the other position.

Means are provided for automatically deenergizing the solenoid 98 to permit the stylus to drop upon the record to start the playing thereof at the proper moment after the preceding record has been discarded from the turntable, when it is desired immediately to start the playing of the next record. This means includes suitable circuits to be described, and further includes a pivoted contact 132 normally projecting above the plate 20, in the path of travel of a record being discharged from the turntable. This pivoted contact is moved downwardly by the discharged record during its movement toward the receiver 16, and engages a stationary contact 133 to complete the desired circuits. A horizontal shelf 133' is arranged above the receiver 16 and its inner end terminates at a point spaced from the plate 20, and adjacent the switch 132, to permit the discharged records to pass therebeneath.

Means also are provided for automatically lifting the turntable 23 to discharge a record from the magazine when it is desired to play the next successive record. The means referred to includes electric circuits which will be referred to later, and certain mechanical devices controlled by said circuits for effecting the actual lifting movement of the turntable.

Referring to Figures 5 and 18, the numeral 134 designates a substantially inverted L-shaped rail having an inwardly extending upper flange 135 cut away as at 136 and 137. The rail is provided at its ends and adjacent its lower edge with alined extensions 138 which are pivotally connected in bearings 139 carried by the brackets 32 and 33. Intermediate its ends, the rail 134 is provided with a depending arm 140 having connection at its lower end with one end of a preferably elastic link 141, which may be formed of rubber. A spring 142 is connected at one end to the lower end of the arm 140 and at its opposite end to a plate 143 secured at its ends to the bearings 32 and 33. This spring normally swings the arm 140 outwardly, whereby the collar 47 is adapted freely to rotate without causing the flange 135, or elements to be described, to contact with the roller 51. The outer end of the link 141 is connected as at 144 with an armature 145 of a solenoid 146. In the drawings, the solenoid referred to is illustrated as being arranged in the amplifying horn 90 with the link 141 projecting through an opening 147 therein, but it will be obvious that the solenoid may be mounted at any suitable point.

In the cut out portion 137 of the flange 135, there is arranged a block 148 which corresponds in shape to the flange, the upper faces and inner edges of the block and flange being arranged flush with each other. The block 148 is carried by a leaf spring 149 one end of which projects longitudinally beyond the block 148 and is secured to the rail 134. A somewhat similar block 150 is arranged in the cut-out and also is carried by a leaf spring 151 secured at one end to the rail 134. The block 150 is provided with an upper and inner beveled face 152 for a purpose to be described.

Referring to Figures 5, 6 and 7, the numeral 153 designates an insulating block secured to the plate 143 near its upper end. A bracket 154 is secured to the insulating block and is provided with an upper outstanding end 155 which pivotally supports a shaft 156. A substantially L-shaped switch member 157 is secured to the shaft 156 and is provided with an inner arm 158 arranged in the path of travel of the collar 47. The other end 159 of the switch member is normally in engagement with a contact 160 carried by the insulating strip 153. A spring 161 normally holds the switch member in the position referred to, and as will become apparent, the switch member is adapted normally to complete selected circuits for various purposes and will be moved from normal position to break such circuits only if the turntable continues to move upwardly after the last record has been discharged therefrom, as when the operator fails to stop the machine.

As previously stated, movement of the tone arm to a position over the outer end of the tone groove of a record causes the solenoid 98 to be deenergized to drop the stylus upon the record. However, the tone arm moves freely by gravity to such position and when the collar 122 strikes the contact 119, it bounces slightly, and if the solenoid 98 were deenergized at such moment, the stylus would be caused to drop upon a portion of the record slightly removed from the beginning of the sound groove. Accordingly, means are provided for preventing deenergization of the solenoid 98 until the tone arm has come to rest. Referring to Figures 16 and 17, the numeral 162 designates a base formed of insulating material and having a recess 163 therein. A thermo-responsive member 164 is arranged in the recess 163 and is secured to the insulating block at one end by a screw or the like 165. The thermo-responsive member may be made up of a pair of strips of material having different coefficients of extension whereby it will warp under the influence of heat to cause the free end thereof to move laterally. Upon such movement, the free end of the thermo-responsive member is adapted to engage a contact screw 166 threaded in a plate 167 extending across the adjacent end of the recess 163. A resistance coil 168 surrounds a considerable portion of the length of the thermo-responsive member, and the ends of the coil are connected to suitable binding posts 169. The screw 165 also constitutes a binding post, while a similar device 170 is connected to the plate 167. In the circuits to be described, the binding post 165 and one of the binding posts 169 are electrically connected, as are the binding posts 170 and the other post 169. Movement of the tone arm to initial position completes a circuit through the coil 168 which introduces sufficient resistance into the circuit to prevent operation of the elements which effect deenergization of the solenoid 98, but once the tone arm comes to rest, the coil 168, being then supplied constantly with current, becomes heated, thus causing the thermo-responsive member 164 to warp and thus contact with the screw 166. This movement cuts the resistance 168 out of the circuit, thus permitting deenergization of the solenoid 98 to take place, whereupon the stylus drops upon the record. The thermo-responsive switch referred to is illustrated in Figure 24 of the drawings.

A suitable reversing switch indicated as a whole by the numeral 171 is provided for reversing the direction of rotation of the motor to withdraw the turntable to the bottom of the magazine 21 when it is desired to refill the latter. The reversing switch is illustrated structurally in Figures 5 and 8, and diagrammatically in Figure 24. This switch includes an insulating base 172 secured to the underside of the plate 20 and preferably arranged at right angles thereto. The switch includes a pair of parallel contact arms 173 connected at their outer ends by an insulating member 174 and pivotally connected at their inner ends to ears 175 adapted to be supplied with current in a manner to be described. The arms 173 are adapted selectively to be moved into engagement with contacts 176 and 177, these contacts being connected by crossed wires 178. The elements of the reversing switch thus far described constitute the conventional type of switch for reversing the current through the armature of a motor to reverse the direction of rotation thereof. One of the arms 173 is adapted, when in engagement with its contact 176, to engage an extra contact 179 for a purpose to be described. When the switch is in the position last referred to, the motor will be reversed to move the turntable downwardly toward the bottom of the magazine. One of the arms 173 is secured to a shaft 180 projecting through the plate 20 and provided at its upper end with an operating knob 181. Beneath the knob 181, a pointer 182 is connected to the shaft of the reversing switch and is adapted to be associated with suitable indicia 183 secured or otherwise applied to the face of the plate 20 to indicate the position of the reversing switch.

In addition to the functions of immediately repeating or playing the next record automatically upon the completion of the playing of a record, or at the will of the operator, means are provided whereby the repeating of a record or the playing of the next succeeding record may be accomplished automatically after given intervals of time. This means includes both mechanical devices and electrical circuits, the latter of which will be later referred to in detail. Referring to Figures 23 and 24, the numeral 184 designates a clock preferably of the alarm type having a dial 185 and hour and minute hands 186 and 187 respectively, the dial being provided with the usual numbers 188. Suitable contacts 189 may be arranged against the dial to be engaged by the minute hand 186 during the movement of the latter. The spacing of the contacts 189 depends upon the time intervals it is desired to provide between the playing of the records, and in the present instance one of the contacts is provided for each number on the dial whereby the records may be played at approximately either two or seven minute intervals, as will be described. The contacts 189 are provided with lead wires 190, and alternate lead wires are connected to a common wire 191. The remaining contacts 189 are connected to a second common wire 192.

The back of the clock is provided with the usual time winding knob 193 and alarm winding knob 194, and movement of the latter may be utilized in a manner to be described for causing the machine to operate and play a record when it is desired to utilize the machine for alarm purposes. A contact 195 is pivotally connected between ears 196 and normally is arranged in the path of travel of the key 194. As is well known, the setting off of the alarm of an alarm clock, causes the winding key thereof to turn, and in the present instance the key 194 is adapted to turn when the alarm is operated, and thus engage the contact 195. This action completes a circuit to be described to start the machine, and it will be apparent that the contact 195 may be swung out of operative position to permit the alarm to be wound. The clock 184 may be mounted in any suitable portion of the apparatus, and preferably is arranged in the operating compartment 18, as shown in Figure 2, inwardly of the door 17'.

In Figures 19 to 22 inclusive the structure elements comprising the control means for the various electrical circuits involved in the apparatus is illustrated. Referring to these figures, the numeral 197 designates the body of the control which may be formed of insulating material and shaped, as shown in Figure 19. The body of the control member is provided with an enlarged end 198 having a relatively large recess 199 therein, while the opposite end of the body is tapered as at 200 and provided with an axial opening 201 extending therethrough and communicating with the recess 199. A flexible cable 202 extends through the opening 201 and contains a number of wires which enter the control member to permit the completion of circuits for performing the desired functions of the machine. The flexible cable may be of any desired length to permit the operator to control the machine from any desired point. For convenience in making electrical connections, the cable enters an opening 203 formed in a corner portion of the cabinet and the various wires leading from the cable into the cabinet are connected to suitable clips 204 mounted upon an insulating strip 205. From the clips 204, suitable lead wires are connected to the various elements of the apparatus. The clips 204 are provided merely to permit a centralized arrangement of the ends of the lead wires leading to the various elements of the operating compartment 18, and to permit the wires in the cable 202 easily to be electrically connected to the elements of the apparatus in the cabinet.

Referring to Figures 19 and 20, the numeral 206 designates a plate formed of insulating material arranged in the recess 199. On its upper face, the plate 206 is provided at one side with a plurality of contacts 207, 208 and 209, and at its opposite side with a plurality of contacts 210, 211 and 212. Intermediate the sets of contacts referred to, a dead or neutral contact 213 is arranged. The contacts 207 to 213 inclusive are arranged on an arc of a circle concentric with the body of the control member and inwardly of the contacts 207, 208 and 209, and concentric therewith, is arranged a pair of elongated contacts 214 and 215 which are substantially coextensive with the contacts 207, 208 and 209 for a purpose to be described. Similarly, a pair of contacts 216 and 217 is arranged inwardly of, concentric to, and coextensive with the contacts 210, 211 and 212.

An insulating block 218 is secured against the plate 206 by a screw or the like 219 and is secured by a similar element 220 to an overhanging support 221 preferably formed of insulating material. The free end of the support 221 is provided with a bushing 222 through which extends a rotatable shaft 223, the latter also extending through the plate 206 and into a bushing 224 formed of insulating material. The upper end of the shaft 223 is provided with a circular plate 225 forming a closure for the upper end of the recess 199, and the latter is provided with a cylindrical enlargement 226 in which the plate 225 is downwardly movable. A spring 227 normally retains the plate 225 in its upper position, as shown in Figure 19. A switch arm 228 is carried by the shaft 223 and is provided with a down-turned end 229 adapted to selectively engage the contacts 207 to 213 inclusive. Intermediate its ends, the switch arm 228 is provided with an insulating bushing 230 slidably receiving a pin 231 having a head 232 at its lower end adapted to bridge across the contacts 214 and 215, or across the contacts 216 and 217. Stop pins 217' are arranged beyond the ends of the arcuate contacts referred to and contact with the head 232 and thus limit the turning movement of this element and the switch arm 228. Each of the contacts 214 to 217 may be provided with a pin 233 extending through the plate 206 and secured to a connection 234, the latter, in turn, being connected to the proper lead wire extending from the cable 202. Similarly, the lower ends of the contacts 207 to 213 may be provided with suitable binding posts 235. The pin 231 is normally projected downwardly by a spring 236, as shown in Figure 19. Current may be supplied to the switch arm 228 through a plate 237, contacting at its inner end with the shaft 223 the outer end of this plate being connected to a binding post 238.

The swinging of the switch arm 228 into engagement with the several concentric contacts referred to is adapted to effect the performance of certain functions automatically upon the completion of the playing of a record, and means are provided for completing the necessary circuits immediately, when desired, without waiting for the record to be played through to the end thereof. A stationary contact 239 is secured against the lower face of the plate 206 and depends therefrom, the lower end 240 of the contact 239 extending laterally beneath the axis of the shaft 223. A resilient arm 241 is secured against the bottom of the plate 206 at right angles to the contact 239, and is provided with a lower laterally extending portion 242 arranged over the horizontal portion 240 of the contact 239. The extension 242 is provided with a platinum or similar contact 243, as shown in Figure 19. The insulating bushing 224 is provided with a depending axial extension 244 arranged over the arm 242, and it will be apparent that depression of the plate 225 by the knob carried thereby is adapted to bring the projection 244 into contact with the arm 242 to move the contact 243 downwardly into engagement with the arm 240. This action, in a manner to be described, completes the circuits which normally would be completed when the stylus reaches the end of the tone groove of a record, when the switch arm 228 is arranged on either of the contacts 207 to 212 inclusive. The upper ends of the arms 239 and 241 obviously are connected to certain of the wires passing through the cable 202.

The enlarged portion of the body of the control is provided with a recess 245 in which is arranged an index strip 246 preferably covered by a strip 247 of isinglass or other transparent material. A depending finger 248 is secured at its upper end to the plate 225 and has its free end arranged adjacent the strip 246. Suitable indicia is provided on the strip 246 with which the finger 248 is adapted to register to indicate the actions which it is desired to perform. The strip 246 is divided near its top by a horizontal line 249 which divides the strip into two portions preferably provided with the indicia "Movements" and "Time" as indicated by the numerals 250 and 251. The various movements indicated are "Repeat" (252), "Stop" (253), and "Change" (254). Corresponding with the "Time" division of the indicia strip, there are suitable indications over which the finger 248 is adapted to be placed to indicate whether a record is to be repeated or changed immediatley, after the completion of the playing of a record, or after desired time intervals. For instance, under the heading "Repeat" there are the numerals "0", "7", "2", and "7". When the finger is placed on the indication "0", the record will be repeated immediately upon the completion of the playing thereof, while if the finger is placed on either numeral "7", the repeating of the record will take place after a seven minute interval. Similarly the placing of the finger over the numeral "2" will cause circuits to be completed to repeat the record after the passage of a two minute interval. The same numerals appear under the heading "Change" and the same operations will take place except that the record will be changed at the completion of the playing thereof, and thus it will be apparent that after a record has been played completely, it automatically will be discarded, and the next record will be played immediately, or after two or seven minute intervals, as may be desired. When it is desired to stop the machine after the completion of the playing of a record, the finger 248 is placed over the indication "Stop" under which conditions the playing of the record will continue until the end thereof is reached, whereupon the apparatus automatically will stop.

Electric circuits are associated with the various mechanical and electrical elements previously described, and these circuits are illustrated in detail in Figure 24 of the drawings. Referring to this figure, the numerals 255 and 256 designate positive and negative leads respectively connected to a suitable source of current. It will be apparent that the electrical elements comprising the apparatus may be wired either for direct or alternating current, as may be desired. The positive and negative leads may be connected to a lamp 257 which may be arranged in the operating compartment 18 merely for the purpose of providing illumination therein if desired when making adjustments, etc.

A wire 258 is connected at one end to the positive lead 255 and at its opposite end to the switch arm 158, the latter normally engaging the contact 160, while this engagement is adapted to be broken by upward movement of the collar 47. However, the arm 158 is arranged in such position that it will not be engaged by the collar 47 until the latter has moved to such a position that all of the records will be discharged from the magazine. A wire 259 is connected at one end to the contact 160 and at its opposite end to a resistance coil 260 wound about a thermo-responsive member 261 similar to the member 164 previously described. The opposite end of the coil 260, and one end of the thermo-responsive member 261 are connected to a lead wire 262 which in turn is connected to the negative lead wire 256. It will be apparent that when the circuit is closed through the wire 258, arm 158, contact 160, wire 259, coil 260, and wire 262, the coil 260 will be energized, thus warping the thermo-responsive member 260 into engagement with a contact 263 connected to a lead wire 264.

A manually controlled switch 265 is preferably arranged in the positive wire ahead of the lead 258 and is adapted to engage a contact 266. It will be apparent that all of the circuits involved in the apparatus are arranged beyond the switch 265, except the lamp 257, and hence the opening of the switch 265 is adapted to open all of the circuits controlling the various functions of the apparatus. For instance, regardless of the position of the switch 158, the circuit controlled thereby can be completed only if the switch 265 is closed.

The wire 264 is connected to a wire 267, which is connected to the contact 129 by a wire 267', and the wire 267 extends through the cable 202 and into the control for connection with the binding post 238, the wire thus having electrical connection with the switch arm 228. In this connection, it is pointed out that the various elements arranged in the control illustrated in Figures 19 to 22 of the drawings have been shown in Figure 24 as being enclosed in a dotted line rectangle which has been designated as the "control." In Figure 24 of the drawings, the end of the switch arm 228 has been shown as being provided with a transversely elongated head 268, for the purpose of illustration, to make it apparent that the switch is adapted to assume a position in which current will be supplied to both of the contacts 207 and 208, for a purpose to be described. Structurally, however, the switch arm may be made as illustrated in Figure 19, being provided with a downturned end 229, while the contacts 207 and 208 are arranged sufficiently close together to permit such downturned end to engage either or both of the contacts referred to. Lead wires 269 and 270 are connected respectively between the contacts 207 and 208, and the common wires 191 and 192 of the clock, and signal lights 271 and 272 are connected in parallel with the lead wires 269 and 270. The lights are connected to the positive side of the circuit through wires 271' and 272'. The signal lights are preferably red and green respectively, and are employed for the purpose of indicating visually to the operator the time intervals which will elapse between the playing of records, when the control switch 228 is set to provide such intervals. Current supplied to the common wires 191 and 192 will be communicated to the minute hand 186 of the clock as the latter passes over the respective contacts 189, and the minute hand is connected to one end of a lead wire 273. The opposite end of the wire 273 is connected to one end of a resistance coil 274 wound about a thermo-responsive member 275 similar to the corresponding elements previously described.

The opposite end of the coil 274 is connected through a wire 276 to the alarm key 194 of the clock, this key being adapted to engage the contact 195 previously described. The contact 195 is connected by a wire 277 to a supply wire 278 one end of which is directly connected to the positive lead 255. It will be apparent that the completion of circuits through the contacts 189 and clock hand 186 is dependent upon the engagement of the key 194 and contact 195, and these elements are normally in contacting relation. Thus it will be apparent that the circuit is open between the key 194 and contact 195 only when the alarm is utilized, in which case, the clock hand 186 is adapted successively to pass over the contacts 189 without affecting the apparatus in any manner until the alarm is set off, under which condition the key 194 turns as the alarm spring unwinds, until it engages the contact 195 which acts as a stop to prevent further turning movement of the key 194. Upon subsequent completion of the proper circuit when the hand 186 engages the proper contact 189, the apparatus will start to function in a manner to be described.

The positive side of the motor 67 is directly connected to the positive lead 255 by a wire 279 while the circuit through the motor is adapted to be completed at the negative side thereof through a lead wire 280 connected to branches 281 and 282, these branches being adapted to function in different manners under conditions to be described. The end of the wire 281 is connected to the armature 127. One end of the thermo-responsive member 275 is connected to the branch wire 282 through a wire 283, while the opposite end of the thermo-responsive member is adapted to be brought into engagement with a contact 284 when the circuit is completed through the heating coil 274. A wire 285 is connected at one end to the contact 284 and at its opposite end to the negative supply wire 267. It will be apparent that when one of the clock circuits is completed to energize the coil 274, a circuit will be completed and the negative side of the motor through wires 267 and 285, contact 284 and thermo-responsive member 275, and wires 283 and 282 and hence the motor current is bridged around the clock mechanism thus avoiding passing the heavy current required by the motor through the light contacts afforded by engagement of the clock hand 186 with the contacts 189.

The contacts 207 and 208 are connected respectively to the contacts 210 and 211, within the control, by lead wires 286 and 287, and thus it will be apparent so far as the clock circuits are concerned, that the operation of the apparatus will be the same, regardless of whether the switch arm 228 is arranged at the "Repeat" or "Change" side of the control. The differences in the operations under these two conditions will be controlled by other circuits which are completed by bridging across the contacts 214 and 215 or 216 and 217, by the contact 232 carried by the switch arm 228. The contact 216 is connected by a wire 288 to the wire 278 previously described, while the contact 217 is connected to one end of a lead wire 289. The opposite end of the wire 289 is connected to one end of the coil of the solenoid 146 previously described, while the opposite end of this coil is connected to one end of a lead wire 290 having its opposite end connected to the contact 130. For the sake of simplicity of illustration, the solenoid 146 has been shown in Figure 24, as having its armature 145 connected at its end to a pivoted lever 291, this lever in turn being connected to the rail 134, whereby it will be apparent that energization of the solenoid to attract its armature will move the rail 134 inwardly with respect to the axis of the turntable, and into the path of travel of the roller 51 in its rotative movement.

As previously stated, means are provided for elevating the stylus at the completion of the playing of a record, this means comprising in part the solenoid 98 and associated elements. One lead wire 292 of this solenoid is connected to a wire 293 which leads to the positive wire 255, while the wire 293 also is connected to one end of the resistance coil 105 surrounding the thermo-responsive member 104. The opposite end of the coil 105 is connected to a wire 294 which, in turn, is connected at its opposite end to the lead wire 290. The other end of the coil of the solenoid 98 also is connected to the lead wire 294, as shown in Figure 24. It will be apparent that the coil of the solenoid 98, and the resistance coil 105 are connected in parallel, and thus energization of the coil 105 occurs simultaneously with energization of the solenoid, thus placing the thermo-responsive member 104 in operative position to act as a brake against the armature 99 to drop the stylus upon the record relatively slowly when the solenoid 98 is deenergized.

The arcuate contact 214 is connected to one end of a lead wire 295 the opposite end of which is connected to one end of the coil of the magnet 125, the opposite end of this coil being connected to the wire 281 by a lead 296. Under certain conditions to be described, the lead wires referred to are adapted to complete a circuit through the magnet 125 thus attracting the corresponding end of the armature 127 to bring the arm 128 into engagement with the contact 129. Similarly, one end of the coil of the magnet 126 is connected by a lead 297 to the wire 281 while the opposite end of the magnet coil connects with a wire 298. The opposite end of this wire is adapted to be connected to the positive supply wire 278 upon depression of the plate 225 (see Figure 19) which constitutes a push button 299, as shown in Figure 24, to bring the contacts 239 and 243 of the control into engagement with each other. The lead wire 298 also is connected to the contact 117 by a lead 300. In Figure 24, the tone arm 72 is shown as being provided with a projection constituting the contact band 122 which is adapted to engage the contact 117 upon the completion of the playing of a record. Current is supplied to the contact 122 by a wire 301 which is shown in Figure 24 as being grounded upon the tone arm.

The reproducer is automatically lifted upon the completion of the playing of a record, as previously stated, upon the happening of which condition the stylus swings back toward the beginning of the sound groove of the record by gravity. When the stylus reaches a position over the beginning of the record, the contact 122 is adapted to engage the contact 119 which is connected to one end of a wire 302. The opposite end of this wire is connected in series with the resistance coil 168, the opposite end of this coil being connected with the arcuate contact 215 through a wire 303 leading into the control. One end of the thermo-responsive member 164 is connected to the wire 303 by a lead 304, while warping of the thermo- responsive member under the influence of heat generated when the coil 168 is energized, is adapted to bring the opposite end thereof into engagement with the contact 166 which is connected to the wire 302 by a short head 305.

The contacts 209 and 212 are adapted to be engaged by the end of the switch arm 228 when it is desired either to repeat the same record or change to the next succeeding record automatically immediately upon the completion of the playing of a record. These contacts are connected to each other by a wire 306 which in turn is connected to one end of the wire 282, as shown in Figure 24.

As will be explained, deenergization of the solenoid 98 to drop the stylus upon a record after the preceding record has been discarded, is dependent upon a connection between the wires 295 and 302. Accordingly, the trip switch 132 is connected to the wire 302 by a wire 307, while the stationary contact 133 is connected to the wire 295 by a lead 308. Thus it will be apparent that as a record passes from the turntable by gravity, it engages the trip switch 132 to connect the wires 295 and 302.

The structure of the reversing switch has been previously described. The arms 173 are connected respectively to the positive and negative wires 278 and 282 by leads 309 and 310, while the contacts 176 are connected to the ends of the armature coils by wires 310'. The reversing switch, except for the presence of the contact 179, is adapted to function in the ordinary manner to reverse the current through the armature so as to cause opposite rotation of the motor. In this connection, it may be stated, that the motor is of a type provided with an automatic switch which prevents the reversing switch from functioning while the motor is rotating in either direction. Accordingly it will be apparent that the reversing switch cannot be tampered with during the normal playing of a record to cause the turntable to be driven in a reverse direction. The automatic switch referred to forms no part of the present invention, although it is desired to employ this construction for the reasons stated. The contact 179 is connected by a lead wire 311 to the negative lead wire 256, and thus negative current will be supplied to one of the arms 173 when the reversing switch is swung in the reversing direction wherein the arms 173 engage the contacts 176. The additional lead wire 311 is provided inasmuch as the circuit through the wires 280 and 310 will be broken by the opening of the switch 158 when the turntable continues its upward movement beyond the point where the last record is discharged from the magazine.

The operation of the apparatus is as follows:

It is believed that the operation of the mechanical devices will be understood from the foregoing description. It will be apparent that normally, the turntable 23 will be in such a position that the collar 47 will not contact with the switch arm 158, and the latter, therefore, will be in engagement with the contact 160, thus completing a circuit in the manner described through the resistance coil 260. Under such conditions, current will be supplied to the positive side of the motor through the wire 279, and to the negative side through one of several selective circuits fed by the wires 267 and 264, the latter being connected to the negative side of the source through the contact 263, thermo-responsive member 261, and wire 262. Regardless of the position of the switch 158, however, a circuit may be completed to the motor to drive the latter in a reverse direction to withdraw the turntable into the magazine. Assuming that the magazine previously has been emptied and the turntable is at its uppermost position, whereby the collar 47 is in engagement with the switch 158 to open the latter, the negative connection to the motor may be made through the wire 311. The reversing switch is moved to bring the arms 173 into engagement with the contacts 176, one of the arms 173 simultaneously engaging the contact 179 to supply current to wires 310 and 280, and thus to the negative side of the field of the motor. As previously stated, the positive end of the field will be connected to the wire 255 through the connection 279. Positive current will be supplied to the reversing switch through wires 278 and 309, and since one of the arms 173 of the reversing switch is in engagement with the contact 178, current will be supplied to the armature through contacts 176 and wires 310'. The armature current will travel in a reverse direction with respect to that supplied to the field, and accordingly the motor will be rotated in a reverse direction and will similarly rotate the driving disk 40. In order to withdraw the turntable 23 into the magazine, it is essential, as will be obvious, to arrange the rail 134 in the path of travel of the roller 51 to effect longitudinal movement of the collar 47 along the screw threads 46. Ordinarily, current from the negative side is supplied to the solenoid 146 to move the rail 134, through wires 264 and 267 and their several connections, but this circuit obviously will be broken when the switch 158 is opened. Means is provided for effecting energization of the coil 146 under such circumstances. Under the motor reversing conditions stated, the arms 173 will be in engagement with the contacts 176 and 179, and so far as any manual operation for effecting energization of the solenoid 146 is concerned, it merely is necessary to operate the push button 299. The armature 124 normally is arranged in the position shown in Figure 24, and when the push button 299 is operated, current will travel through wires 255 and 278, through the push button and wire 298 to the magnet 126. From the coil of the magnet 126 current passes through wires 297, 281, 280 and 310 to the reversing switch, thence through one arm of the latter to contact 179 and wire 311, and thence to the negative lead 256. The push button merely is pressed momentarily and it will be apparent that the magnet 126 will be energized to swing the armature 124 to its opposite position with the arm 128 thereof in engagement with the contact 130. Assuming that the manually operated switch 265 previously had been opened, the solenoid 98 would be deenergized, thus releasing the armature 99 and dropping the stylus upon the record. The energization of the magnet 126 by operating the push button 299, however energizes the solenoid 98 again to lift the stylus, and also energizes the solenoid 146 to place the rail 134 in the path of travel of the roller 51. Starting from the positive wire 255, under such conditions, it will be apparent that curent will flow to the solenoid 98 through wires 293 and 292, and from the solenoid 98 through wire 294, to the wire 290. From the latter wire, a circuit is completed through contact 130, arm 128, armature 124, wires 281, 280 and 310, and thence back to the negative side of the source through the reversing switch, contact 179 and wire 311. Thus the solenoid 98 will be energized and will lift the stylus from the record. In order to energize the solenoid 146, it is necessary for the switch arm 228 of the control to be swung into engagement with either of the contacts 210, 211, or 212 to permit the contact 232 to bridge across the arcuate contacts 216 and 217. Under such conditions, current will flow from wire 255, through wires 278 and 288 to the contact 216, and thence to the contact 217 through the contact 232 carried by the switch arm 228. From the contact 217 current flows through wire 289 and solenoid 146 and thence to wire 290 from which it returns to the negative side of the circuit in the same manner as the current previously described passing through the solenoid 98. Thus the solenoid 146 also will be energized and the rail 134 will be swung into the path of travel of the roller 51 to prevent rotation of the collar 47 whereby the latter will travel downwardly along the screw threads 46. Obviously when the table has been withdrawn the desired distance into the magazine, the reversing switch may be opened, thus stopping the motor, and consequently the turntable, whereupon the records may be placed on the spindle 25 in superimposed relation to be supported upon the turntable 23.

As will be explained in detail, the placing of the switch arm 228 upon either of the contacts 207, 208 or 209, whereby the contact 232 will bridge across the arcuate contacts 214 and 215, will cause a record to be repeated upon the completion of the playing thereof, either immediately or after intervals of time. Similarly, the placing of the switch arm 228 on either of the contacts 210, 211 or 212, whereby the contact 232 will bridge across the arcuate contacts 216 and 217, will cause a record to be discarded immediately upon completion of the playing thereof or after time intervals, to permit the next record to be played. As previously explained, the discarding of a record is dependent upon upward movement of the turntable 23 with respect to the spindle 25 whereby a record will be disconnected from the latter to slide by gravity from operative position, and this movement of the turntable is dependent upon placing the rail 134 in the path of travel of the roller 51 to prevent rotation of the collar 47. Obviously, the only circuit which can be completed through the solenoid 146 must pass across the arcuate contacts 216 and 217 and therefore, if the switch arm 228 is in any position other than one in which the contact 232 bridges across the arcuate contacts 216 and 217, a record cannot be discarded since the collar 47 merely will rotate with the turntable without moving axially along the threads 46. This fact should be borne in mind in the following description in which the repeating actions first will be considered. Assuming that the operator desires a record to be repeated immediately upon completion of the playing thereof, he will move the finger 248 (see Figures 19 and 21) to the "0" position under the heading "Repeat" at which time the switch arm 228 will be in engagement with the contact 209, the contact 232 also bridging across the contacts 214 and 215. As previously stated, the armature 124 normally is in the position shown in Figure 24 with the arm 128 in engagement with the contact 129. Assuming again that the stylus is traveling in the sound groove of the record intermediate the ends thereof, it will be apparent that the contact 122 carried by the tone arm (see Figure 24) will be intermediate the contacts 117 and 119. Under such conditions, the positive side of the motor will be connected to the wire 255 through wire 279. The circuit through the heating coil 260, controlled by the switch 158, will be completed thus maintaining the thermo-responsive member 261 in engagement with the contact 263. The circuit to the negative side of the motor then will be completed through wire 262, thermo-responsive member 261, wires 264, 267, 267', contact 129, arm 128 and armature 127, and wires 281 and 280. The reversing switch receives positive current through wires 278 and 309 and negative current through wire 310. It will be obvious that the wire 309 is shown as being connected to the wire 278, and that it may be connected at any other suitable point in the positive side of the circuit, such as the wire 279 leading to the positive side of the motor. This current causes the motor to be driven to rotate the table 23 while the record is being played in the normal manner, which condition already has been assumed. As the stylus approaches the end of the tone groove of the record, the contact 122 obviously approaches the contact 117. Referring to Figure 10, it will be noted that the contact 117 is preferably a platinum strip carried by the arm 114 which is adapted to swing about its pivot when engaged by the contact 122. This construction is provided to permit the contact 122 to swing beyond the point at which it engages the contact 117 to accommodate the apparatus to various makes of phonograph records, provided with stop operating grooves of different shapes at their inner ends, which have their innermost portions arranged at varying distances from the centers of the records.

As soon as the contacts 117 and 122 come into engagement with each other in the manner stated, a circuit will be completed to the solenoid 98 to lift the stylus from the record. The wire 267 is connected to the negative side of the circuit in the manner previously referred to and a circuit from this wire to control the solenoid 98 is completed through switch arm 228, contact 209, wires 306, 282, 281 and 297, the coil of magnet 126, wires 298 and 300, contacts 117 and 122 and back to the positive side of the circuit through wire 301. Obviously the current will have passed through magnet 126, thus attracting its end of the armature 127 and bringing the arm 128 into engagement with the contact 130. It will be apparent that the movement of the armature 127 is permitted since no current is passing through the magnet 125. When the arm 128 engages the contact 130, another circuit will be completed which is identical with that last described, starting with the negative side of the source and continuing through the wire 281. Picking up the newly completed circuit at this point, it will be noted that it passes through armature 127, arm 128, contact 130, wires 290 and 294 to the heating coil 105 and solenoid 98, and from the latter elements back to the positive side of the source through wires 292 and 293. Thus the solenoid 98 will be energized to attract its armature 99 (see Figure 9) and thus pull down the link 87 and the adjacent end 85 of the lever 84. This action rocks the shaft 81 about its pivot causing the finger 82 (see Figure 4) to engage the pin 83 and thus elevate the reproducer and stylus from the record. It will be apparent that simultaneously with the energization of the solenoid 98, the coil 105 will become heated, thus warping the thermo-responsive brake member 104 to bring it into engagement with the armature 99.

As previously stated, the solenoid 146 can be energized only when the arcuate contacts 216 and 217 are bridged which action does not take place when the switch arm 228 is in engagement with the contact 209, this being the position of the switch arm under the operating conditions assumed. Therefore the rail 134 will be maintained out of engagement with the roller 51 whereby the collar 47 will continue to rotate in the normal manner. Thus the same record which previously has been played will be maintained at the top of the magazine.

The tone arm and elements carried thereby are slightly overbalanced by the weight 97 (see Figure 9) whereby the tone arm normally has a slight tendency to swing toward the outer edge of the record to place the stylus over the beginning of the sound groove. This action takes place immediately upon the lifting of the tone arm in the manner stated, when the solenoid 98 is energized. Thus the contact 122, carried by the tone arm, would immediately start to travel toward the contact 119, thus breaking the previously described circuit through the magnet 126. However, the arm 128 will be maintained in engagement with the contact 130 by the frictional means employed, such as the strip 131, and accordingly the circuit through the solenoid 98 will remain closed.

The contact 119 is fixed with respect to records of a given size by tightening the proper nut 110 (see Figure 8) since the sound grooves of different makes of records start at the same position with respect to the center of the records when the latter are of the same size. When the contact 122 engages the contact 119, the solenoid 98 will be deenergized to release the tone arm to permit the stylus to engage in the beginning of the sound groove. In order to deenergize the solenoid 98, it is necessary to move the arm 128 out of engagement with the contact 130. The circuit for accomplishing this result passes from the negative side of the circuit to the switch arm 228 through the wire 267, in the manner previously described, and thence to the contact 209, wires 306, 282, 281 and 296, the coil of magnet 125, wire 295 and arcuate contact 214. The circuit continues to the contact 215, through the contact 232 carried by the switch arm 228, through wire 303, coil 168, wire 302 and contact 119, thence back to the positive side of the source through contact 122 and wire 301. In connection with this circuit, it will be recalled that the tone arm has swung by gravity to the starting position, thus bringing the contacts 119 and 122 in engagement with each other.

The circuit referred to involves the heating coil 168 through which insufficient current passes to permit the magnet 125 to be energized. It will be noted that as the tone arm swings toward starting position, the contact 122 engages the contact 119, which is fixed against movement in the manner referred to, and there is a slight tendency for the tone arm to bounce away from the starting position. It is not desired to drop the stylus upon the record until the tone arm has come to rest with the contacts 119 and 122 in firm engagement, and it is for this reason that the coil 168 and its associated thermo-responsive member 164 are provided. Any tendency of the tone arm to bounce in the manner referred to is very slight, but if the stylus were dropped at the instant the contacts 119 and 122 initially engage each other, the stylus would contact with the tone groove a slight distance from the beginning thereof. During the slight bouncing action referred to, the circuit through the resistance coil 168 will be interrupted once or twice, thus preventing it from becoming properly heated until the tone arm has come to rest at the starting position. When this occurs, the thermo-responsive member 164 will become heated, thus bringing it into engagement with the contact 166 and permitting sufficient current to pass through the magnet 125 to energize the latter, and thus attract its end of the armature 127. The arm 128 thus will swing away from the contact 130 and into engagement with the contact 129, whereupon the circuit through the solenoid 98 will be broken. During the time the solenoid 98 is energized, current obviously will pass through the coil 105, thus keeping the thermally operated brake 104 in engagement with the armature 99. When the solenoid 98 is deenergized in the manner referred to, current also will cease to pass through the coil 105, but the brake will remain in contact with the armature 99 a sufficient length of time to frictionally engage the latter to retard its upward movement. Thus the stylus 90 will be returned gently upon the record to prevent injury to the latter and to the stylus. Attention also is invited to the fact that it is preferred to employ a link 87, connected between the armature 99 and the reproducer lifting lever 84 formed of slightly elastic material owing to the suddenness with which the solenoid acts when energized, to prevent the too sudden jerking of the reproducer.

As has been previously pointed out the negative side of the circuit to the motor includes the wire 267' and contact 129 when the latter is engaged by the arm 128, but the circuit to the motor is completed when the arm 128 moves into engagement with the contact 130 to perform the functions described. With the switch arm 228 in engagement with the contact 209, the negative side of the circuit will be completed from the contact 209 through wires 306, 282 and 280 and thus it will be apparent that the operation of the motor is not dependent upon the engagement of the arm 128 with the contact 129. Conversely, while the apparatus is operating to play a record in the normal manner, the arm 128 is in engagement with the contact 129 to complete the negative side of the circuit to the motor, and this circuit therefore is not dependent upon the position of the switch arm 228 and the latter may be swung to any position with respect to the control contacts without affecting the playing of the record in any manner except after the latter has been played entirely to the end thereof.

Assuming that the switch arm 228 is in engagement with the contact 209, which condition previously has been supposed, and the stylus is traveling in the tone groove intermediate the ends of the record, the operator, if he so desires, may instantly cause the record to be repeated by moving the stylus back to the beginning of the record without awaiting the automatic repeating action which would take place at the completion of the playing of the record. Under such conditions, it merely is necessary for the operator to depress the push button 299, which action corresponds to the depression of the plate 255 (see Figure 19) to bring the contact 243 into engagement with the arm 239. Current will then flow from the positive lead wire 255 through wire 278, push button 299, wire 298, the coil of magnet 126, wires 297, 281, 282 and 306, thence to contact 209 and through switch arm 228 and back to the negative side of the source in the manner previously referred to. This action obviously energizes the magnet 126 to attract its end of the armature and bring the arm 128 into engagement with the contact 130, thus energizing the solenoid 98 to lift the reproducer to permit the tone arm to swing back to initial position. The energization of the solenoid 98 takes place in the same manner as that previously stated, except that the circuit through the magnet 126 is completed by operation of the push button instead of awaiting the completion of the circuit across the contacts 117 and 122 which normally occurs automatically at the end of the playing of the record. It merely is necessary momentarily to operate the push button 299, after which the functions necessary to repeat the record will be continued automatically. In other words, the tone arm will swing back to initial position, thus completing the circuit involving the contacts 117 and 122, and the arcuate contacts 214 and 215. This circuit previously has been described in detail and it is not necessary to repeat this description, except to state that it causes energization of the magnet 125 and consequently breaks the circuit to the solenoid 98 to again drop the stylus to the beginning of the sound groove. Thus the operator may repeat a record at will when the stylus is intermediate the ends of the sound groove, or may permit the repetition to take place automatically upon completion of the playing of the record.

If desired, the automatic repeating of a record may be delayed for different intervals of time, at the will of the operator. According to the structure illustrated, the intervals may be approximately either two or seven minutes in length. It will be apparent, however, that the structure may be altered if it is desired to vary these intervals. If it is desired to repeat a record after a two minute interval, the finger 248 may be placed over the numeral "2" under the heading "Repeat" (see Figures 19 and 21), while the finger may be placed over either of the numerals "7" under the heading "Repeat" for seven minute intervals if desired. The numerals "7" referred to, correspond to the contacts 207 and 208, while the numeral "2" corresponds to a position intermediate these contacts, at which intermediate position the end of the switch arm engages both of the contacts 207 and 208.

The placing of the finger 248, and consequently the switch arm 228, in either of the positions just stated, is adapted at the proper times to close suitable circuits for actuating the control means of the apparatus whereby a record will be repeated after the desired interval, such circuits including the contacts 189 on the face of the clock, as will be described.

Assuming a record to be playing, which it is desired to repeat after an interval of seven minutes, the armature 124 will be in the position illustrated in Figure 24, and current will be supplied to the negative side of the motor through wires 267 and associated connections, wire 267', contact 129, arm 128 and armature 127, and wires 281 and 280. As will be understood from the circuits previously described, the armature 127 is reversed to bring the arm 128 thereof into engagement with the contact 130, when the stylus reaches the end of the tone groove, and the contacts 117 and 122 are in engagement with each other. Under such conditions, as previously stated, the negative side of the circuit to the motor will be broken at the contact 129. Under the conditions previously considered, wherein the record is repeated immediately upon the completion thereof, the negative side of the circuit was completed through the switch arm 228, contact 209, and wires 306, 282 and 280. When a record is to be repeated after a seven minute interval, the switch arm will be in engagement with either of the contacts 207 and 208, in which case the negative side of the motor circuit just considered, will be broken. The arm 128 having swung away from the contact 129 and into engagement with the contact 130 upon the completion of the playing of the record, it will be apparent that the negative side of the motor circuit will be broken, and the motor will stop.

It will be assumed that the switch arm 228 is in engagement with the contact 208 which is connected to the outer common wire 191 of the clock, and in the embodiment of the invention illustrated, this common wire is connected to the contacts 189 corresponding with the even numbers on the dial of the clock. Assuming again that the hand 186 of the clock was at the position shown in Figure 24 when the playing of the record was completed, it will be apparent that after the proper interval of time, the minute hand will engage the contact 189 corresponding with the numeral "8" of the clock dial, and the negative side of the circuit to the motor will be completed in the following manner. From the clock hand 186, which is connected to the negative side of the source through the elements just considered, the circuit passes through wire 273, coil 274 and wire 276 to the alarm winding key 194 which normally is in engagement with the contact 195. From the latter contact the circuit is completed through wires 277 and 278 to the positive side of the source. It is not desired for the full current drawn by the motor to pass across the light contact afforded between the clock hand and the dial contacts, and accordingly the completion of the circuit just described is adapted to complete another circuit to the motor. Energization of the resistance coil 274 causes the thermo-responsive member 275 to become heated and thus warped into engagement with the contact 284. The circuit to the negative side of the motor is then completed from wire 267, through wire 285, contact 284, thermo-responsive member 275, and wires 283, 282 and 280. Thus when the hand of the clock reaches the dial contact referred to, the motor again will start. In this connection attention is invited to the fact that at the completion of the previous playing of the record, the arm 128 was moved into engagement with the contact 130 in the manner previously described. The completion of the circuit to the motor upon the passing of the desired time interval again energizes the solenoid 98 to lift the tone arm from the end of the record, the circuit through the solenoid 98 previously having been traced. The solenoid circuit obviously will be completed to the negative side of the source upon completion of the circuit controlled by the clock mechanism as just described. The lifting of the tone arm then permits it to swing back to the beginning of the record, thus bringing the contacts 119 and 122 into engagement with each other. The circuit to the magnet 125 then will be completed, since with the assumed position of the switch arm 228, the arcuate contacts 214 and 215 will be bridged by the contact 232. This action deenergizes the solenoid 98 and permits the stylus to drop upon the record to repeat it.

With the switch arm 228 in engagement with the contact 208, as above stated, the time circuits will be completed each time the hand 186 passes over a contact 189 associated with the even numbers of the clock dial, and similarly when the switch arm 228 is in engagement with the contact 207, circuits will be completed through the contacts 189 associated with the odd numbers of the clock dial. The contacts 189 of each set obviously are arranged ten minutes apart, and assuming the playing length of a record to be three minutes, the record will be repeated after a seven minute interval. If it is desired to repeat the record after a two minute interval, the pointer 248 is placed in registration with the numeral "2", under the heading "Repeat" (see Figures 19 and 21) under which conditions the switch arm will be connected to both of the contacts 207 and 208. All of the contacts 189 of the clock dial will then be operative upon the passage of the hand 186 thereover. It will be apparent that the contacts 189 are arranged five minutes apart, and again allowing approximately three minutes as the playing time of a record, it will be noted that the records will be played at two minute intervals.

The red and green lights 271 and 272 are not in any way essential to the completion of the circuits through the clock mechanism, but simply are provided if desired, as a signal to the operator whether the clock mechanism is set to play the following record at two or seven minute intervals. If the switch arm 228 is arranged on either of the contacts 207 or 208, obviously, only one of the lights referred to will be illuminated, and thus, independently of the control, the operator is advised that the records will be played at seven minute intervals. If both contacts 207 and 208 are engaged by the switch arm 228, obviously the lights 271 and 272 both will be illuminated, thus advising the operator that the control is set for two minute intervals between records.

When it is desired to employ the apparatus in place of an alarm clock, the alarm key is wound up and left in a position out of engagement with the contact 195. The alarm is then set at the desired time and the switch arm 228 may be placed on either of the contacts 207 or 208, but preferably in engagement with both contacts. The passage of the hand 186 over the dial contacts will not cause the motor to start and the machine to operate since the negative side of the circuit will be broken between the contact 195 and the winding key 194. It is necessary of course, that the arm 128 be in engagement with the contact 130 so that the negative side of the circuit to the motor also will be broken at the contact 129. At the proper time, the alarm will operate and the spring thereof will unwind, thus causing the key 194 to turn until it comes into engagement with the contact 195 which acts as a stop to limit the further turning movement of the alarm key. As soon as the clock hand 186 engages the next dial contact, therefore, the circuit will be completed in the same manner as when playing records at time intervals, and the machine will start to operate in the manner previously set forth. With the arm 228 engaging either or both of the contacts 207 and 208, it will be apparent that the machine will repeat the record at time intervals according to the position of the switch arm 228. As will become apparent, the alarm mechanism, as well as the playing of different records, can be operated also with the switch arm in engagement with either or both of the contacts 210 and 211, since these contacts are connected respectively to the contacts 207 and 208.

The playing of successive records after the completion of the playing of a record, during the playing of a record, and after time intervals will now be considered in the order named. When it is desired to set the apparatus to start the playing of successive records immediately upon the completion of the playing of the preceding ones, the control finger 248 is placed over the numeral "0" under the heading "Change". This places the end of the switch arm 228 in engagement with the contact 212, while the contact 232 carried by the switch arm, will bridge across the contacts 216 and 217. Regardless of the position of the arm 128 of the armature 127, the negative side of the circuit to the motor will be completed in the manner previously set forth since the contacts 209 and 212 are both connected to the wire 282 and the succeeding wires leading to the negative side of the motor. The operation of the machine during the playing of a given record under such circumstances will be the same as in the preceding cases, and need not be referred to in detail. Instead, however, of simply energizing the solenoid 98 to lift the reproducer, permitting the tone arm to swing back to initial position, and then deenergizing the solenoid 98 to drop the stylus upon the record, the solenoid 146 will be energized simultaneously with the solenoid 98 to change the record while the stylus is held suspended in inoperative position.

As soon as the stylus reaches the end of the tone groove of the record being played, the contacts 117 and 122 will be brought into engagement, thus energizing the magnet 126 in the manner previously described, and swinging the arm 128 into engagement with the contact 130. The circuit to the solenoid 98 will be completed in the same manner as previously set forth, through wire 281, armature 127 and its arm 128, contact 130, wires 290, 294, 292 and 293, and thus back to the positive side of the source. In addition to the current passing through the solenoid 98, the current also passes along the wire 290 to the solenoid 146, thence back to the positive side of the source through wires 289, contacts 217, 232 and 216, and wires 288 and 278. Thus the armatures 98 and 146 will be simultaneously energized, the former elevating the tone arm while the latter moves the rail 134 into the path of travel of the roller 51. By preventing rotation of the collar 47, through the roller 51, the collar will be caused to travel upwardly along the threads 46, thus elevating the turntable 23. In this connection, it will be apparent that the motor will continue to revolve since the circuit thereto is completed through the switch arm 228 and contact 212, and associated wires and other elements. The arm 128 will remain in engagement with the contact 130, as will be obvious, until the magnet 125 is energized. The spindle 25 (see Figure 15) does not partake of longitudinal movement, and accordingly the movement of the turntable in the manner stated, causes the records in the magazine to be moved upwardly along the spindle 25. This action continues until the uppermost record, the playing of which has just been completed, clears the top of the spindle 25, whereupon it will slide by gravity across the top of the next adjacent record, and thus pass from the magazine downwardly toward the receiving pocket 16. In its passage from the magazine, the record thus being discarded engages the trip switch 132 (see Figure 3), which has been designated in Figure 24 as the "trip". The movement of the record, therefore brings the switch momentarily into engagement with the contact 133. It should be borne in mind that the energization of the solenoid 98 caused the reproducer and stylus to be lifted, whereupon the tone arm immediately started to move toward the initial position, and thus contact will have been established between the contacts 119 and 122 before the previously played record was discharged from the magazine. Thus, when the trip switch is operated, a circuit momentarily will be completed through wire 301, through the tone arm and contact 122, contact 119, wires 302 and 307, through the trip switch and wire 308 and thus to the magnet 125 through wire 295. From the magnet 125, the current flows through wires 296, 281 and wire 282 and thence back to the negative side of the source through the connections previously described, including the switch arm 228. Thus the magnet 125 will be energized to swing the armature 127 to the position shown in Figure 24, thus breaking connection with the contact 130 and establishing connection with the contact 129. The movement of the arm 128 away from the contact 130 breaks the circuits just described through the solenoids 98 and 146, and thus the rail 134 will be withdrawn from contact with the roller 51 to permit rotation of the turntable without axial movement thereof, and to release the reproducer and stylus to start the playing of the next record. Thus it will be apparent that if the switch arm 228 is left in engagement with the contact 212, successive records will be played immediately in the order in which they are arranged in the magazine.

The operator, in addition to permitting the automatic changing of the records at the completion of the playing thereof, may immediately discard a record and start the playing of the next one without awaiting the completion of the playing of a record. In order to accomplish this, it merely is necessary to operate the push button 299. As will be apparent from the foregoing description, the energization of the solenoids 98 and 146 is dependent upon the energization of the magnet 126 to move the arm 128 into engagement with the contact 130, and this normally occurs automatically when the contacts 117 and 122 come into engagement with each other at the completion of the playing of a record. Assuming the stylus to be traveling along the sound groove intermediate the ends thereof, and assuming the switch arm 228 to be in engagement with the contact 212, the operator may press the button 299, in which case a circuit will be completed from positive wire 255, through wire 278, through the push button 299, wire 298, magnet 126, wires 297, 281 and 282, and thus back to the negative side of the source through the connections previously described, including the switch arm 228. Thus the magnet 126 will be energized without waiting for the playing of the record to be completed, and the arm 128 will be brought into engagement with the contact 130 to complete the previously described circuits through the solenoids 98 and 146. Thus it will be apparent that the record being played may be discarded at any time at the will of the operator to permit the playing of the next record to begin.

In order to discard a single record to permit the playing of the next one, it merely is necessary to depress the push button 299 momentarily, or to permit the desired actions to take place automatically at the end of the record. The operator, if he so desires, may successively discard a number of records until a record is reached which it is desired to play. This can be accomplished by depressing the push button 299, and holding it in such position until the desired record is reached. Depression of the push button energizes the magnet 126 in the manner previousy described to swing the armature 127 and bring the arm 128 into engagement with the contact 130. Under such conditions the solenoids 98 and 146 will be energized to move the turntable upwardly and to hold the reproducer suspended above the record. Each successive record, as it passes over the trip switch 132, will energize the magnet 125, but if the push button 299 is held depressed by the operator, this action will have no effect upon the armature 127, since both magnets 125 and 126 will be energized, but the armature will be more strongly attracted by the magnet 126 with which it is in engagement. Thus, the reproducer may be held suspended above the records until a record is reached which it is desired to play.

As previously stated, the playing of successive records, as well as the repetition of the same record may take place at suitable time intervals. This is accomplished by placing the switch arm 228 upon either contact 210 or 211, or at an intermediate position to engage both of these contacts. The contacts referred to are connected to the clock dial contacts in series with the contacts 207 and 208 respectively through wires 286 and 287, and so far as the clock circuits are concerned, they will be completed in the same manner as when the switch arm 228 engages the contacts 207 and 208. It is believed therefore that the clock circuits need not be referred to again in detail.

Assuming the switch arm to be in engagement with both contacts 210 and 211, it will be apparent that the contact 232, carried by the switch arm 228, will bridge across the arcuate contacts 216 and 217 as in the case previously considered, in which the changing of a record and the playing of the next succeeding record took place immediately. Under such conditions, the circuit through the magnet 126 will be established upon the completion of the playing of a record, by engagement of the contacts 117 and 122, and thus the arm 128 will swing into engagement with the contact 130. The circuits through the solenoids 98 and 146 normally would be completed in the manner previously set forth, the circuit through the solenoid 146 including the bridged contacts 216 and 217. No current, however, will be supplied to the solenoids 98 and 146 at this time, for a reason to be set forth. The circuit to the motor, however, will be interrupted by movement of the arm 128 away from the contact 129, and by virtue of the fact that upon the completion of the playing of the record the clock hand 186 will not yet have reached the next successive contact 189. Accordingly the motor will stop and the operation of the machine will be discontinued.

Attention is invited to the fact that as the stylus approaches the end of the sound groove, the negative side of the circuit will be completed only through the wire 267', since the circuit through the switch arm 228 will be broken by virtue of the fact that the hand 186 is not in engagement with one of the energized contacts of the dial face, and accordingly the circuit is broken practically simultaneously with the energization of the magnet 126 when the playing of the record is completed. Thus there will, in fact, be no current supplied to the solenoids 98 and 146, and the tone arm will not be lifted, nor will the turntable be moved to discharge a record. The arm 128, however, will have swung into engagement with the contact 130, and as soon as the negative side of the circuit is closed upon engagement between the clock hand 186 and one of the dial contacts, the circuits through the solenoids 98 and 146 will be completed and these elements will function to lift the reproducer and cause the upward movement of the turntable to discharge a record. This condition will prevail, of course, until the record is discharged from the turntable and closes the circuit through the magnet 125 by depressing the trip switch 132. Thus, the playing of successive records at spaced intervals, is adapted to take place automatically merely by placing the switch arm 228 in engagement with either or both of the contacts 210 and 211.

As previously stated, the switch arm 228 may be swung to any point within its limits of movement while a record is being played without affecting the operation of the machine, since the negative side of the circuit, under such conditions, will be completed through the wire 267'. If it is desired, however, to stop the machine automatically upon the completion of the playing of a record, the switch arm merely is placed in engagement with the contact 213 and allowed to remain in such position. The contact 213 is a dead one, and accordingly the negative side of the circuit cannot be completed through the switch arm 228 when the latter is in engagement with this contact. Under such conditions, as soon as the end of a record is reached, the contacts 117 and 122 will come into engagement, thus effecting energization of the magnet 126 to swing the arm 128 out of engagement with the contact 129, and thus the negative supply to the motor will be cut off, and the motor will cease to function and the apparatus will stop.

Thus it will be apparent that when the machine stops playing at the end of a record, when the switch arm 228 has been left in engagement with the contact 213, the arm 128 will remain in engagement with the contact 130. The negative side of the circuit, however, will then be open, and the solenoid 98 will not be energized, and thus the stylus will remain upon the record. If, under such circumstances, the operator should reverse the direction of rotation of the motor by changing the reversing switch, the solenoid 98 immediately will be energized to lift the stylus from the record. The circuit to the solenoid referred to would then be through wire 311, contact 179, the adjacent arm of the reversing switch, wires 310, 280 and 281, armature 127 and arm 128, contact 130, wires 290 and 294, and thence through the solenoid 98 and back to the positive side of the source. It will be obvious therefore that the reproducer immediately will be lifted from the record.

Assuming that the magazine has been only partially filled with records, and it is desired to start the machine, the reversing switch is again placed in forward position with the arms thereof in engagement with the contacts 177, and the switch arm 228 is moved into engagement with the contact 212. As previously stated, this arrangement of the circuits is adapted for changing the records, but the completion of the circuits necessary to start the playing of a record is dependent upon the energization of the magnet 125 and the consequent deenergization of the solenoid 98 by moving the arm 128 away from contact 130. With the switch arm 228 in engagement with the contact 212, the necessary circuits ordinarily are completed by operation of the trip switch 132 when a record is discharged from the turntable. However, under the conditions stated, wherein the uppermost record is beneath the upper end of the spindle, the solenoids 98 and 146 will remain energized whereby the stylus will be suspended above the record while the rail 134 will be arranged in the path of travel of the roller 51, and thus cause upward movement of the turntable. Such action normally would continue until the uppermost record is discharged from the magazine to operate the trip switch, and accordingly the first record would not be played. This condition, however, may be overcome to permit the first record to be played, merely by operating the trip switch manually when the first or uppermost record reaches a position flush with the upper end of the spindle 25. In this connection it should be recalled that the solenoid 98 was energized while the turntable was being lifted and accordingly the tone arm will have swung back to its initial position thus bringing the contacts 119 and 122 into engagement with each other. The trip switch will then operate in the previously described manner to energize the magnet 125 and thus break the connection between the arm 128 and contact 130, whereupon the circuits through the solenoids 98 and 146 will be broken. The stylus will then drop to the record to start the playing thereof, while the rail 134 will be released from the roller 51 to permit the turntable to continue its rotation without being elevated.

Under the conditions previously considered, wherein the switch arm 228 is in engagement with either of the contacts 210, 211 or 212, it will be apparent that the rail 134 will be brought into engagement with the roller 51 after the playing of a record has been completed, either immediately or after a time interval, whereby the turntable will be elevated to discharge the record which has just been played. If the switch arm 228 is left on either of the contracts referred to, the apparatus will automatically play successive records until the magazine has been emptied. In connection with this matter, attention is invited to the fact that the switch arm 158 is arranged in such a position that it will be opened an instant before the last record leaves the turntable 23. However, the coil 260 will have been heated, and the circuit to the negative side of the apparatus through the thermo-responsive member 261 will not be instantaneously broken, and the motor will continue to operate and elevate the turntable until the last record is discharged therefrom. This record therefore will perform the same functions as any other record automatically discharged from the magazine, in that it will pass over the trip switch 233, thus closing the circuit through the magnet 125. This action results in breaking the circuit between the arm 128 and contact 130, and thus the circuits to the solenoid 98 and 146 will be broken, the rail 134 returning to inoperative position while the reproducer is permitted to drop as in starting to play a record. Almost simultaneously with this action, the thermo-responsive member 261 will be cooled sufficiently to break the circuit through the contact 263, and thus the circuit to the motor through the switch arm 228, will be broken and the motor will cease to operate. Referring to Figure 3, it will be noted that the turn table is somewhat smaller in diameter than the records, and the starting position of the stylus is outwardly of the periphery of the turntable. Accordingly when the magazine has become emptied in the manner above stated, the stylus will not drop upon the turntable, but at a point outwardly thereof. The elements which control the raising and lowering of the reproducer obviously may be provided with any means to limit their movement to prevent the reproducer from falling too far when the magazine is empty.

Referring to Figure 3, it will be noted that the walls 28 and 29 of the receiving pocket 16 diverge toward their upper ends. Records discharged from the magazine strike the pad of the wall 28 at an acute angle thus causing the lower edge of the record to turn downwardly toward the bottom of the pocket. It also has been found that a slight bouncing action of the records causes the upper edge to swing away from the wall 28 and toward the wall 29. Thus the wall 28 is left clear to prevent successive records from striking those previously discharged into the pocket and breakage of the records is effectually prevented.

It will be apparent that when records of different sizes are to be played, the contacts associated with the tone arm may be adjusted to close the necessary circuits at the proper time. Accordingly it will be apparent that the knobs 110 may be loosened to permit the respective contacts 117 and 119 to be moved further inwardly or outwardly with respect to the records.

Referring to Figures 5 and 18, attention is invited to the blocks 148 and 152 which are provided merely as safety measures to prevent the turntable from being moved upwardly or downwardly beyond its normal limits. As previously stated, the collar 47 is adapted to engage the switch arm 148 to open the circuit to the motor if the switch arm 228 is left on one of the "Change" contacts 210, 211 or 212 after the last record of the magazine has been played. If the switch arm 228 remains in such position, the motor will be driven after the last record is discharged from the turntable and the latter will continue its upward movement by virtue of the arrangement of the rail 134 in the path of travel of the roller 51. Under such conditions, the collar 47 will finally reach a point where it will engage the switch arm 158 and thus break its connection with the contact 160 and the motor will stop. If, for any reason, the switch 158 should fail to function in the manner stated, the turntable will continue its upward movement until the roller 51 comes into contact with the block 150, whereupon the engagement of the roller with the beveled face 152 will cause the block to be moved outwardly against the tension of the spring 151, and the block will thereby clear the roller 51 and permit the latter to rotate and thus prevent further upward movement of the turntable. Similarly, when the motor is reversed to withdraw the turntable into the magazine, the roller 51 will travel along the rail 134 until it reaches the block 148. Under such conditions, the roller will travel beneath the flange 135 of the rail, as shown in Figure 13. When the roller reaches the block 148, the beveled face 52 of the roller will engage beneath the flange of the block thus causing it to be moved outwardly against the tension of the spring 149 thereby clearing the roller to permit the collar 47 to rotate. The turntable will thereupon partake of no further downward movement.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A phonograph comprising a table for rotatably supporting a record disk, driving means for said table, a swinging tone arm, a reproducer including a stylus adapted to travel in the sound groove of a record arranged on said table, means including a weight tending to move the tone arm to a position with the stylus coinciding in position to the beginning of the sound groove of the record, means for elevating the reproducer to free the stylus from the record, means for releasing the reproducer for downward movement when the stylus reaches a position over the beginning of the sound groove, and an electrically operated brake for retarding downward movement of the reproducer.

2. A phonograph comprising a table for rotatably supporting a plurality of superimposed record disks, driving means for said table, reproducing means including a stylus adapted to travel in the sound groove of the uppermost record, automatic means for elevating the stylus when it reaches the end of the sound groove and for discarding the uppermost record, said stylus having a normal bias to initial position over the starting point of the sound groove of a record arranged on said table, and means controlled by the passing of a record from said table for lowering the stylus into engagement with the next succeeding record.

3. A phonograph comprising a table for rotatably supporting a plurality of superimposed record disks, driving means for said table, reproducing means including a stylus adapted to travel in the sound groove of the uppermost record, electrically controlled means automatically operable for elevating the stylus when it reaches the end of the sound groove and for discarding the uppermost record, said stylus having a normal bias to initial position over the starting point of the sound groove of a record arranged on said table, and electrically controlled means automatically operable upon the passage of the uppermost record from said turntable for rendering said first named electrically controlled means inoperative to lower the stylus into engagement with the next succeeding record.

4. A phonograph comprising a table for rotatably supporting a plurality of superimposed record disks, driving means for said table, reproducing means including a stylus adapted to travel in the sound groove of the uppermost record, manually controlled means for elevating the stylus at any point along the sound groove of the uppermost record and for discarding such record, said stylus having a normal bias to initial position over the starting points of the sound grooves of records arranged on said table, and means automatically operable by the uppermost record upon its passage from said turntable for rendering said manually controlled means inoperative to lower the stylus into engagement with the next succeeding record.

5. A phonograph constructed in accordance with claim 4 provided with automatic means for retarding downward movement of the stylus.

6. A phonograph constructed in accordance with claim 4 provided with an automatic brake associated with and operable simultaneously with said manually controlled means for retarding downward movement of the stylus.

7. A phonograph construction in accordance with claim 4 provided with automatically operable means for elevating the stylus when it reaches the end of the sound groove of and for discarding the uppermost record, and automatic means for retarding downward movement of the stylus.

8. In a phonograph, an inclined record supporting turntable, an axially fixed centering spindle projecting through said turntable for holding a plurality of superimposed record disks thereon, reproducing means including a stylus adapted to travel in the sound groove of a record arranged on said turntable, means for elevating the stylus to free it from the record, and means for releasing a record from operative position with respect to the spindle to permit it to move from such position by gravity.

9. In a phonograph, an inclined record supporting turntable, an axially fixed centering spindle projecting through said turntable for holding a plurality of superimposed record disks thereon, reproducing means including a stylus adapted to travel in the sound groove of a record arranged on said turntable, automatic means operable when the stylus reaches the end of the sound groove for elevating the stylus to free it from the record, and means for releasing a record from operative position with respect to the spindle to permit it to move from such position by gravity.

10. In a phonograph, an inclined turntable adapted to support a plurality of record disks, an axially fixed centering spindle projecting through said turntable for holding a plurality of superimposed record disks thereon, reproducing means including a stylus adapted to travel in the sound groove of the uppermost record, automatic means operable when the stylus reaches the end of a record for elevating the stylus and transferring it to a position over the beginning points of the sound grooves of the records on said turntable, means operable upon elevation of the stylus for releasing the uppermost record from operative position with respect to the spindle to permit it to move from such position by gravity, and means for lowering the stylus into engagement with the next succeeding record after the preceding record has moved from the turntable.

11. In a phonograph, an inclined turntable adapted to support a plurality of record disks, an axially fixed centering spindle projecting through said turntable for holding a plurality of superimposed record disks thereon, reproducing means including a stylus adapted to travel in the sound groove of the uppermost record, manually controlled means operable regardless of the position of the stylus in the sound groove of the uppermost record for elevating the stylus and transferring it to a position over the beginning points of the sound grooves of the records on said turntable, means operable upon elevation of the stylus for releasing the uppermost record from operative position with respect to the spindle to permit it to be discharged from such position by gravity, and means for lowering the stylus into engagement with the next succeeding record after the preceding record has been discharged from the turntable.

12. A phonograph constructed in accordance with claim 11 provided with means automatically operable when the stylus reaches the end of a record for elevating it and transferring it to a position over the beginning points of the records arranged on said turntable.

13. A phonograph constructed in accordance with claim 11 provided with means for retarding downward movement of the stylus.

14. In a phonograph, an inclined record supporting table adapted to support a plurality of record disks, an axially fixed centering spindle projecting through said turntable for holding a plurality of superimposed record disks thereon, a swinging tone arm, a reproducer carried by said arm and including a stylus adapted to travel in the sound groove of the uppermost record, electro-magnetic means for elevating the reproducer to free the stylus from the record, said reproducer having a normal bias to initial position with the stylus arranged over the starting points of the sound grooves of the records, and means operable upon elevation of the stylus for releasing the uppermost record from operative position with respect to the spindle to permit it to be discharged from such position by gravity.

15. A phonograph constructed in accordance with claim 14 provided with means for lowering the stylus into engagement with the next succeeding record upon the discharge of the preceding record from the spindle.

16. A phonograph constructed in accordance with claim 14 provided with means operative upon passage of the uppermost record from the spindle for lowering the stylus into engagement with the next succeeding record.

17. In a phonograph, a record supporting turntable, a tone arm pivotally supported at one end, the pivot axis of said arm being inclined from the vertical, a reproducer including a stylus adapted to travel in the sound groove of a record arranged on said table and carried by the opposite end of said tone arm, weight means carried by said tone arm on the opposite side of the pivot thereof from said reproducer and tending normally to swing the tone arm to an initial position with the stylus over the starting point of the sound groove of a record, means for elevating the stylus to free it from the record and permit said arm to swing to initial position, and means operable upon elevation of the stylus for discarding a record from the turntable.

18. In a phonograph, an inclined turntable adapted to support a plurality of records, a tone arm arranged substantially parallel to and above said turntable, said arm being pivotally supported at one end and having its pivot axis arranged substantially at right angles to said turntable whereby said arm is adapted to swing in a plane substantially parallel thereto, a reproducer carried by the free end of said tone arm and including a stylus adapted to travel in the sound groove of the uppermost record, means for elevating the reproducer to free the stylus from the record, said tone arm being overbalanced whereby it has a normal bias to an initial position with the stylus arranged over the starting points of records on said table when the reproducer is elevated, means operable upon elevation of the reproducer for discharging the uppermost record from the turntable, and means operable upon the discharge of the record for lowering the stylus into engagement with the next successive record.

19. A phonograph constructed in accordance with claim 18 wherein the means for elevating the reproducer includes a solenoid operatively connected to said reproducer and adapted to be automatically energized when said stylus reaches the end of the sound groove of a record.

20. A phonograph constructed in accordance with claim 18 wherein the means for elevating the reproducer includes a solenoid operatively connected to said reproducer and adapted to be automatically energized when said stylus reaches the end of the sound groove of a record, and manually controlled means operable regardless of the position of the stylus in the sound groove of a record for energizing said solenoid.

21. In a phonograph, an inclined drive shaft, a turntable arranged axially with respect to said shaft and adapted to be rotated thereby, said turntable being adapted to partake of axial movement with respect to said shaft, a spindle extending axially from said shaft through said turntable and fixed against axial movement with respect thereto, said spindle being adapted to extend through the center openings of a plurality of records arranged on said turntable, reproducing means including a stylus adapted to travel in the sound groove of the uppermost record, means for transferring said stylus to a point spaced above the starting points of the sound grooves of the records, means operable upon actuation of said last named means for effecting axial movement of said turntable with respect to said spindle until the uppermost record is released from the latter for discharge therefrom, and means for releasing the stylus for downward movement into engagement with the next successive record after the preceding record has been discharged from said spindle.

22. A phonograph constructed in accordance with claim 21 wherein the means for effecting relative movement between said spindle and said turntable comprises a collar connected to said turntable and normally rotating therewith, said shaft being threaded for reception in said collar, and means for preventing rotation of said collar whereby it is caused to travel along said shaft.

23. A phonograph constructed in accordance with claim 21 wherein the means for effecting relative movement between said spindle and said turntable comprises a collar connected to said turntable and normally rotating therewith, said shaft being threaded for reception in said collar, a roller carried by said collar and extending laterally therefrom, a rail arranged parallel to said shaft and normally disposed outwardly of the path of travel of said roller, and means for moving said rail into the path of travel of said roller to prevent rotation of said collar.

24. In a phonograph, a turntable, a spindle extending axially through and above said turntable and adapted to extend through the center openings of a plurality of record disks whereby the latter may be supported on said turntable, reproducing means including a stylus adapted to travel in the sound groove of the uppermost record, means for elevating the stylus from the record, means including an electric circuit for effecting axial movement of the turntable with respect to the spindle to discharge successive uppermost records therefrom and operative when the stylus is elevated, said circuit including a thermo-responsive member adapted to alter its shape under the influence of heat to complete said circuit under certain conditions, a heating coil surrounding said member, a switch normally closing the circuit through said heating coil, and means movable with said turntable and adapted to engage and open said switch upon movement of the turntable with respect to the spindle to a point where the last record is discharged from said spindle.

25. In a phonograph, a turntable, reproducing means including a stylus adapted to travel in the sound groove in the uppermost of a plurality of record disks arranged on said turntable, a pair of contacts, a switch arm adapted to selectively engage said contacts, a motor for driving said turntable, circuits for said motor including in part said switch arm and either of said contacts under certain conditions, a relay including a pair of magnets, a common armature and an arm, a pair of contacts adapted to be engaged by said arm according to the magnet of the relay which is energized, a pair of contact strips associated with each of said first named contacts, a member carried by said switch arm and adapted to selectively engage either pair of contact strips, a solenoid for effecting elevation of said stylus from the record, said stylus having a normal bias to an initial position over the starting points of the sound grooves of the records, a second solenoid operative to discharge successive records from said turntable, said first named solenoid being included in the circuit of each pair of contact strips, both of said solenoids being included in the circuit of one pair of contact strips, means operative when the stylus reaches the end of a record to energize one magnet of said relay and thus energize only the first named of said solenoids, means operative when said member is in engagement with the other pair of contact strips for energizing the same magnet of said relay and thus energize both of said solenoids to lift the stylus from the record and discharge the record from said turntable, and means operative when the stylus reaches initial position for energizing the other magnet of said relay to deenergize the solenoid or solenoids previously energized and permit the stylus to drop upon the record.

26. A phonograph constructed in accordance with claim 25 provided with manually controlled means for closing circuits through said first named solenoid or through both solenoids regardless of the position of the stylus in the sound groove of a record.

27. A phonograph constructed in accordance with claim 25 provided with a second contact associated with each pair of contact strips, and means operable at intervals for closing circuits through said last named contacts depending upon the condition of said switch arm, to energize the first mentioned magnet of said relay and thus energize said first named solenoid or both of said solenoids.

28. A phonograph constructed in accordance with claim 25 provided with a second contact associated with each pair of contact strips, means normally operable at intervals for closing circuits through said last named contacts depending upon the condition of said switch arm, to energize the first mentioned magnet of said relay and thus energize said first named solenoid or both of said solenoids, an alarm clock mechanism including said last named means, and a switch member operable by the alarm mechanism of said clock for controlling the circuits through said last named contacts.

29. In a phonograph, a turntable, a centering spindle projecting axially through said turntable for holding a plurality of superimposed record disks thereon, said turntable being inclined from the horizontal and having threaded connection with said spindle, means for normally driving said spindle and said turntable as a unit, and means for preventing rotation of said turntable whereby the threaded connection between said spindle and said turntable causes the latter to move axially with respect to said spindle for releasing a record disk from said spindle to move from operative position thereon by gravity.

30. In a phonograph, a turntable, a centering spindle projecting axially through said turntable for holding a plurality of superimposed record disks thereon, said spindle being fixed against axial movement and having threaded connection with said turntable, said turntable being inclined from the horizontal, means for rotating said spindle to rotate said turntable, and means for preventing rotation of said turntable with said spindle whereby the former is adapted to move axially with respect to said turntable for successively releasing record disks from said spindle to move from operative position thereon by gravity.

31. In a phonograph, a record magazine, a swinging tone arm, a reproducer carried by the tone arm and including a stylus adapted to travel in the sound groove of the uppermost record in said magazine, means for elevating the reproducer and transferring it to a position with the stylus over the beginning of the sound grooves of the records in said magazine, means operative upon the elevation of said reproducer for discarding the uppermost record from said magazine, and means operative by the discarded record upon movement thereof from said magazine for releasing the reproducer for downward movement whereby the stylus thereof engages the sound groove of the next succeeding record.

32. In a phonograph, a record magazine, a swinging tone arm, a reproducer carried by the tone arm and including a stylus adapted to travel in the sound groove of the uppermost record arranged in said magazine, means tending to move the reproducer to starting position with the stylus thereof arranged above the beginning of the sound grooves of the records in said magazine, a solenoid adapted when energized to elevate the reproducer, means operative after the elevation of said reproducer for discarding the uppermost record from said magazine, and means operative by the discarded record upon movement thereof from said magazine for deenergizing said solenoid and releasing said reproducer for downward movement.

33. A phonograph comprising a turntable for rotatably supporting a record disk, driving means for said table, a swinging tone arm, a reproducer carried by said tone arm and including a stylus adapted to travel in the sound groove of a record arranged on said table, a solenoid, operating connections between said solenoid and said reproducer to elevate the latter upon energization of said solenoid, means controlled by movement of the reproducer to the end of a record for closing a circuit through said solenoid, said tone arm having a normal bias to initial position with the reproducer arranged with the stylus thereof over the beginning of the sound groove of the record whereby the tone arm will swing to such initial position when said solenoid is energized, means for opening the circuit through said solenoid when the tone arm reaches the initial position, and an electrically controlled brake associated with said solenoid and adapted to be energized simultaneously therewith for engaging said operating connections to retard the downward movement of the reproducer.

34. A phonograph comprising a turntable for rotatably supporting a record disk, driving means for said table, a swinging tone arm, a reproducer carried by said tone arm and including a stylus adapted to travel in the sound groove of a record arranged on said table, a solenoid, operating connections between said solenoid and said reproducer to elevate the latter upon energization of said solenoid, means controlled by movement of the reproducer to the end of a record for closing a circuit through said solenoid, said tone arm having a normal bias to initial position with the reproducer arranged with the stylus thereof over the beginning of the sound groove of the record whereby the tone arm will swing to such initial position when said solenoid is energized, means for opening the circuit through said solenoid when the tone arm reaches the initial position, a thermo-responsive member adapted to alter its shape under the influence of heat, and a heating coil surrounding said member and connected in the circuit of said solenoid and adapted to be energized simultaneously therewith, said member being adapted to engage said operating connections when said heating coil is energized to act as a brake to retard downward movement of the reproducer.

35. A phonograph comprising a turntable for rotatably supporting a record disk, driving means for said table, a swinging tone arm, a reproducer carried by said tone arm and including a stylus adapted to travel in the sound groove of a record arranged on said table, a solenoid, an armature associated with said solenoid, a lever movable in one direction to lift said reproducer, connections between said armature and said lever, means controlled by movement of the reproducer to the end of a record for closing a circuit through said solenoid, said tone arm having a normal bias to initial position with the reproducer arranged with the stylus thereof over the beginning of the sound groove of a record whereby the tone arm will swing to such initial position when the solenoid is energized, means for opening the circuit when the tone arm reaches the initial position, a thermo-responsive member adapted under the influence of heat to change its shape to bring it into engagement with said armature to act as a frictional brake thereagainst, and a heating coil surrounding said member and connected in the circuit to said solenoid.

36. In a phonograph, an inclined turntable, a spindle arranged axially with respect to said turntable and projecting upwardly therefrom to extend through the center openings of a plurality of record disks to support the latter on said turntable, reproducing means including a stylus adapted to travel in the sound groove of the uppermost record, said spindle and said turntable being fixed against relative movement during the playing of a record, means for elevating the stylus from the record, means including a solenoid operable upon elevation of said stylus for effecting relative axial movement between said spindle and said turntable until the uppermost record has been freed from the spindle to be discharged therefrom, and means controlled by the movement of a record from said spindle for rendering said solenoid inoperative.

37. In a phonograph, an inclined turntable, a spindle arranged axially with respect to said turntable and projecting upwardly therebeyond to extend through the center openings of a plurality of record disks to support the latter on said turntable, reproducing means including a stylus adapted to travel in the sound groove of the uppermost record, said stylus having a normal bias to initial position over the beginning points of the sound grooves of the records, said spindle and said turntable being fixed against relative axial movement during the playing of a record, means for elevating the stylus from the record, means including a solenoid operable upon the elevation of said stylus for effecting relative axial movement between said spindle and said turntable until the uppermost record has been freed from the spindle to be discharged therefrom, and means controlled by the movement of a record from said spindle for rendering said solenoid inoperative and for lowering the stylus into engagement with the next successive record.

In testimony whereof I affix my signature.

JUAN BEGOVICH y GARCIA.